(12) United States Patent
Morris

(10) Patent No.: US 10,353,552 B1
(45) Date of Patent: Jul. 16, 2019

(54) APPARATUSES AND METHODS FOR IDENTIFYING A CONTACTEE FOR A MESSAGE

(71) Applicant: SITTING MAN, LLC, Raleigh, NC (US)

(72) Inventor: Robert Paul Morris, Raleigh, NC (US)

(73) Assignee: SITTING MAN, LLC, Raleigh, NC (US)

( * ) Notice: Subject to any disclaimer, the term of this patent is extended or adjusted under 35 U.S.C. 154(b) by 0 days.

(21) Appl. No.: 15/934,909

(22) Filed: Mar. 23, 2018

Related U.S. Application Data

(63) Continuation-in-part of application No. 14/835,662, filed on Aug. 25, 2015, which is a
(Continued)

(51) Int. Cl.
*G06F 3/0482* (2013.01)
*H04L 29/12* (2006.01)
(Continued)

(52) U.S. Cl.
CPC ............ *G06F 3/0482* (2013.01); *H04L 51/02* (2013.01); *H04L 61/1547* (2013.01); *G06F 3/04883* (2013.01)

(58) Field of Classification Search
CPC ... G06F 3/0482; G06F 3/04883; H04L 51/02; H04L 61/1547
See application file for complete search history.

(56) References Cited

U.S. PATENT DOCUMENTS

2005/0177587 A1* 8/2005 Mukundan .............. G06F 9/465
2005/0249344 A1 11/2005 Mueller et al.
(Continued)

FOREIGN PATENT DOCUMENTS

WO 2000057281 A1 9/2000

OTHER PUBLICATIONS

Debjit, "GMail & Multi-Tasking: 3 Things That You Did Not Know", published: Mar. 9, 2010, digitizor.com, https://digitizor.com/gmail-multi-tasking/ (Year: 2010).*
(Continued)

*Primary Examiner* — Seth A Silverman
(74) *Attorney, Agent, or Firm* — Patrick E. Caldwell, Esq.; The Caldwell Firm, LLC

(57) ABSTRACT

Methods and apparatuses are comprising: a screen; an input device; at least one non-transitory memory storing instructions; and one or more processors in communication with the screen, the input device, and the at least one non-transitory memory, wherein the one or more processors execute the instructions to: display, utilizing the screen, a contactor window including: at least one contactor user interface element configured to have presented, in connection therewith, a plurality of contactor identifiers of a contactor communicant represented by a contactor email communications agent, at least one contactee user interface element configured to have presented, in connection therewith, a plurality of contactee identifiers of a plurality of contactee communicants each represented by a corresponding contactee email communications agent, a message user interface element configured to present a message addressed from one of the plurality of contactor identifiers of the contactor selected in connection with the at least one contactor user interface element and to one or more of the plurality contactees selected in connection with the at least one contactee user interface element, and a send user interface element configured to cause the message to be sent.

27 Claims, 7 Drawing Sheets

Related U.S. Application Data continuation-in-part of application No. 12/819,215, filed on Jun. 20, 2010, now abandoned.

(51) Int. Cl.
*H04L 12/58* (2006.01)
*G06F 3/0488* (2013.01)

(56) References Cited

U.S. PATENT DOCUMENTS

| | | | |
|---|---|---|---|
| 2006/0281490 A1 | 12/2006 | Dolgas et al. | |
| 2007/0061132 A1* | 3/2007 | Bodin | G10L 15/193 704/200 |
| 2007/0264977 A1* | 11/2007 | Zinn | H04M 1/274525 455/414.1 |
| 2008/0052364 A1 | 2/2008 | Zhou | |
| 2009/0037413 A1 | 2/2009 | Castell et al. | |
| 2009/0249198 A1 | 10/2009 | Davis et al. | |
| 2010/0015976 A1 | 1/2010 | Issa et al. | |
| 2011/0045806 A1 | 2/2011 | Gupta et al. | |
| 2011/0295928 A1 | 12/2011 | Siegel et al. | |
| 2013/0031196 A1 | 1/2013 | Yan | |
| 2015/0201062 A1* | 7/2015 | Shih | H04M 1/72552 455/564 |
| 2015/0331571 A1 | 11/2015 | Chaudhri | |

OTHER PUBLICATIONS

Brock, "Gmail and MobileMe—Living Together in Perfect Harmony", updated: Jul. 15, 2008, http://jordanbrock.com/2008/07/15/gmail-and-mobileme-living-together-in-perfect-harmony/ (Year: 2008).*

Android Developers, "Spinners", updated Apr. 23, 2018, https://developer.android.com/guide/topics/ui/controls/spinner (Year: 2018).*

Hurdinkatz, https://productforums.google.com/forum/#!topic/gmail/noXuuzg3RX0, Jul. 16, 2011, last accessed Mar. 22, 2018.

Ari Leichtberg, "New in Labs: Suggest more recipients," https://gmail.googleblog.com/2009/04/new-in-labs-suggest-more-recipients.html, Apr. 17, 2009, last accessed Mar. 22, 2018.

Microsoft Blog Post, "Windows Desktop Sharing API," Posted Mar. 8, 2007, available at https://blogs.technet.microsoft.com/enterprisemobility/2007/03/08/windows-desktop-sharing-api/.

Office Action Summary in U.S. Appl. No. 12/819,215 dated Mar. 28, 2013.

Office Action Summary in U.S. Appl. No. 12/819,215 dated Feb. 26, 2014

Office Action Summary in U.S. Appl. No. 12/819,215 dated Mar. 2, 2015

Youtube Video and Transcript, "Intel Wireless Display Demo | Intel," Uploaded Jan 10, 2010, available at https://www.youtube.com/watch?v=5Gm4ADoMFus.

Youtube Video and Transcript, "Office Live Meeting Demo 1: Join a meeting," Uploaded Jan. 8, 2008, available at https://www.youtube.com/watch?v=h9MYNKVg0W8.

* cited by examiner

US 10,353,552 B1

APPARATUSES AND METHODS FOR IDENTIFYING A CONTACTEE FOR A MESSAGE

RELATED APPLICATIONS

This application is a continuation-in-part of, and claims priority to U.S. patent application Ser. No. 14/835,662, entitled "METHODS, SYSTEMS, AND COMPUTER PROGRAM PRODUCTS FOR CONTROLLING PLAY OF MEDIA STREAMS," filed Aug. 25, 2015, which in turn claims priority to U.S. patent application Ser. No. 12/819,215 (published as US 2011-0314097 A1), entitled "METHODS, SYSTEMS, AND COMPUTER PROGRAM PRODUCTS FOR IDENTIFYING A COMMUNICANT IN A COMMUNICATION," filed Jun. 20, 2010, which incorporates by reference the following application: U.S. patent application Ser. No. 12/819,214 (published under US 2011-0314078 A1), entitled "METHODS, SYSTEMS, AND COMPUTER PROGRAM PRODUCTS FOR IDENTIFYING A CONTACTEE IN A COMMUNICATION," filed Jun. 20, 2010.

This application is related to the following U.S. Patent Applications, the entire disclosures being incorporated by reference herein: application Ser. No. 12/819,215 (published as US 2011-0314097 A1) filed on 2010 Jun. 20, entitled "METHODS, SYSTEMS, AND PROGRAM PRODUCTS FOR IDENTIFYING A COMMUNICANT IN A COMMUNICATION"; and U.S. patent application Ser. No. 12/819,214 (published under US 2011-0314078 A1), entitled "METHODS, SYSTEMS, AND COMPUTER PROGRAM PRODUCTS FOR IDENTIFYING A CONTACTEE IN A COMMUNICATION," filed Jun. 20, 2010.

BACKGROUND

To initiate and/or otherwise communicate with another user via a phone, netbook, and/or other communications device, an identifier of the user to be contacted, the "contactee", must be entered, selected, or otherwise provided. A contacting user may recall a contactee's communications address, such as a phone number or email address; may browse an address book or directory; and/or may search for the contactee's address based on a nickname or communicant alias for the contactee and/or by providing a portion of the contactee's communications address or communicant alias.

There are numerous types of communications and the types of communications are growing. The various types of communications, for the most part, are based on different types of addresses (e.g. phone numbers, instant messages IDs, and email addresses). Populating an address book or registry used to be a largely manual process that resulted in address books and registries of relatively small size. Current technologies allow address books and directories to grow automatically. Further software has eased the task of adding information for address book and/or directory entries. Address books and directories are becoming increasingly larger making them more difficult to use.

For many years, information in the various types of communications such as information about the contacting user has been available for assisting in identifying contactees, but has been unrecognized and/or otherwise not included in methods and systems as a tool for addressing communications.

Accordingly, there exists a need for methods, systems, and computer program products for identifying a contactee in a communication.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, an apparatus (and associated method) is provided, comprising: a screen; an input device; at least one non-transitory memory storing instructions; and one or more processors in communication with the screen, the input device, and the at least one non-transitory memory, wherein the one or more processors execute the instructions to cause the apparatus to: display, utilizing the screen, a contactor window including: at least one contactor user interface element configured to have presented, in connection therewith, a plurality of contactor identifiers of a contactor communicant represented by a contactor email communications agent, at least one contactee user interface element configured to have presented, in connection therewith, at least one of a plurality of contactee identifiers of a plurality of contactee communicants each represented by a corresponding contactee email communications agent, a message user interface element configured to present a message addressed from one of the plurality of contactor identifiers of the contactor selected in connection with the at least one contactor user interface element and to one or more of the plurality contactees selected in connection with the at least one contactee user interface element, and a send user interface element configured to cause the message to be sent; receive, in connection with the at least one contactor user interface element of the contactor window and utilizing the input device, an indication of a selection of a first contactor identifier of the plurality of contactor identifiers identifying the contactor communicant represented by the contactor email communications agent; in response to the receipt, in connection with the at least one contactor user interface element of the contactor window and utilizing the input device, the indication of the selection of the first contactor identifier of the plurality of contactor identifiers identifying the contactor communicant represented by the contactor email communications agent: display, in connection with the at least one contactor user interface element of the contactor window and utilizing the screen, the selected first contactor identifier of the plurality of contactor identifiers identifying the contactor communicant represented by the contactor email communications agent; based on the receipt, in connection with the at least one contactor user interface element of the contactor window and utilizing the input device, of the indication of the selection of the first contactor identifier of the plurality of contactor identifiers identifying the contactor communicant represented by the contactor email communications agent: cause a first subset of the plurality of contactee identifiers of the plurality of contactee communicants to be automatically identified, based on the selected first contactor identifier; after the identification, based on the selected first contactor identifier, of the first subset of the plurality of contactee identifiers of the plurality of contactee communicants: display, in connection with the at least one contactee user interface element of the contactor window and utilizing the screen, the first subset of the plurality of contactee identifiers of the plurality of contactee communicants; after the display, in connection with the at least one contactee user interface element of the contactor window and utilizing the screen, of the first subset of the plurality of contactee identifiers of the plurality of contactee communicants: receive, in connection with the at least one contactee user interface element of the contactor window and utilizing the input device, an indication of a selection of at least one of the first subset of the plurality of contactee identifiers of the plurality of contactee communicants; in response to the receipt, in connection with the at least one contactee user interface element of the contactor window and utilizing the input device, of the indication of the selection of the at least one of the first subset of the plurality of contactee identifiers of the plurality of contactee communicants: display, in connection with the at least one contactee user interface element of the contactor window and utilizing the screen, the selected at least one of the first subset of the plurality of contactee identifiers of the plurality of contactee communicants; display, in connection with the message user interface element of the contactor window and utilizing the screen, a first message; receive, in connection with the send user interface element of the contactor window and utilizing the input device, an indication of a selection of the send user interface element for the first message; in response to the receipt, in connection with the send user interface element of the contactor window and utilizing the input device, of the indication of the selection of the send user interface element for the first message: send the first message to at least one first contactee email communications address corresponding to the selected at least one of the first subset of the plurality of contactee identifiers of the plurality of contactee communicants; receive, in connection with the at least one contactor user interface element of the contactor window and utilizing the input device, an indication of a selection of a second contactor identifier of the plurality of contactor identifiers identifying the contactor communicant represented by the contactor email communications agent; in response to the receipt, in connection with the at least one contactor user interface element of the contactor window and utilizing the input device, the indication of the selection of the second contactor identifier of the plurality of contactor identifiers identifying the contactor communicant represented by the contactor email communications agent: display, in connection with the at least one contactor user interface element of the contactor window and utilizing the screen, the selected second contactor identifier of the plurality of contactor identifiers identifying the contactor communicant represented by the contactor email communications agent; based on the receipt, in connection with the at least one contactor user interface element of the contactor window and utilizing the input device, of the indication of the selection of the second contactor identifier of the plurality of contactor identifiers identifying the contactor communicant represented by the contactor email communications agent: cause a second subset of the plurality of contactee identifiers of the plurality of contactee communicants to be automatically identified, based on the selected second contactor identifier, the second subset of the plurality of contactee identifiers of the plurality of contactee communicants being different, at least in part, from the first subset of the plurality of contactee identifiers of the plurality of contactee communicants; after the identification, based on the selected second contactor identifier, of the second subset of the plurality of contactee identifiers of the plurality of contactee communicants: display, in connection with the at least one contactee user interface element of the contactor window and utilizing the screen, the second subset of the plurality of contactee identifiers of the plurality of contactee communicants; after the display, in connection with the at least one contactee user interface element of the contactor window and utilizing the screen, of the second subset of the plurality of contactee identifiers of the plurality of contactee communicants: receive, in connection with the at least one contactee user interface element of the contactor window and utilizing the input device, an indication of a selection of at least one of the second subset of the plurality of contactee identifiers of the plurality of contactee communicants; in response to the receipt, in connection with the at least one contactee user interface element of the contactor window and utilizing the input device, of the indication of the selection of the at least one of the second subset of the plurality of contactee identifiers of the plurality of contactee communicants: display, in connection with the at least one contactee user interface element of the contactor window and utilizing the screen, the selected at least one of the second subset of the plurality of contactee identifiers of the plurality of contactee communicants; display, in connection with the message user interface element of the contactor window and utilizing the screen, a second message; receive, in connection with the send user interface element of the contactor window and utilizing the input device, an indication of a selection of the send user interface element for the second message; and in response to the receipt, in connection with the send user interface element of the contactor window and utilizing the input device, of the indication of the selection of the send user interface element for the second message: send the second message to at least one second contactee email communications address corresponding to the selected at least one of the second subset of the plurality of contactee identifiers of the plurality of contactee communicants. In other embodiments, one or more of the features of the previous embodiment may be omitted, as desired.

In other embodiments, methods and systems are described for identifying a contactee in a communication. In one aspect, the method includes receiving a first contactor alias identifying a contactor communicant represented by a contactor communications agent in a communication via a network. The method further includes locating, based on the first contactor alias, a first contactee communications address in an address space of a communications protocol, for a first contactee communicant not included in the communication. The method still further includes including the first contactee communications address in the communication to include the first contactee communicant in the communication, in response to receiving the first contactor alias. The method additionally includes sending data in the communication, according to the communications protocol and based on the first contactee communications address, for delivery to a first contactee communications agent representing the first contactee communicant.

Further, a system for identifying a contactee in a communication is described. The system includes an execution environment including an instruction-processing unit configured to process an instruction included in at least one of a communicant handler component, a communicant lookup component, a communicant selector component, and a comout component. The system includes the communicant handler component configured for receiving a first contactor alias identifying a contactor communicant represented by a contactor communications agent in a communication via a network. The system further includes the communicant lookup component configured for locating, based on the first contactor alias, a first contactee communications address in an address space of a communications protocol, for a first contactee communicant not included in the communication. The system still further includes the communicant selector component configured for including the first contactee communications address in the communication to include the first contactee communicant in the communication, in response to receiving the first contactor alias. The system additionally includes the com-out component configured for sending data in the communication, according to the communications protocol and based on the first contactee communications address, for delivery to a first contactee communications agent representing the first contactee communicant.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
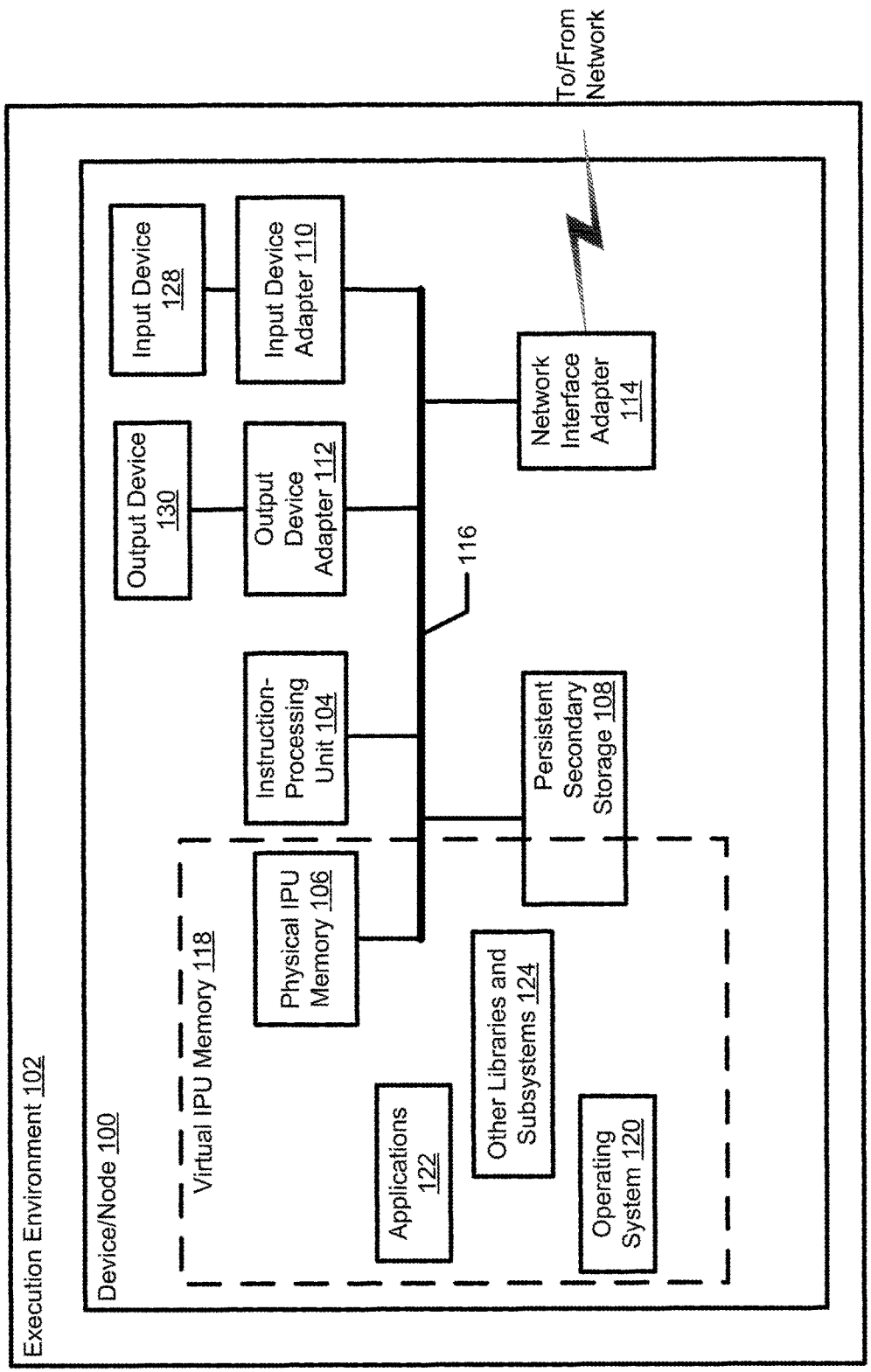
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices, consumer electronic devices, routers, communication servers, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include removable media. The drives and their associated computer readable storage media provide volatile and/or nonvolatile storage for computer readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component. The terms "network node" and "node" in this document both refer to a device having a network interface component for operatively coupling the device to a network.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "device" and "node" as used herein refer to one or more devices and nodes, respectively, providing and/or otherwise included in an execution environment unless clearly indicated otherwise.

As used herein, the term "communication" refers to information including a message sent and/or for sending via a network between communicants. The term "communicant" as used herein refers to a user included in a communication as a sender and/or a receiver of the information. A communicant is represented by a "communications agent" configured to operate in an execution environment to send data to and/or receive data from another communications agent, on behalf of the represented communicant, according to a communications protocol via network. A communications protocol defines and/or otherwise identifies an address space including communications addresses for delivering data sent in a communication from one communications agent to another.

The term "communicant alias" as used herein refers to an identifier of a communicant in a communication where the communicant alias is not a communications address included in an address space of a communications protocol for sending and/or receiving data in the communication.

Figure 2:
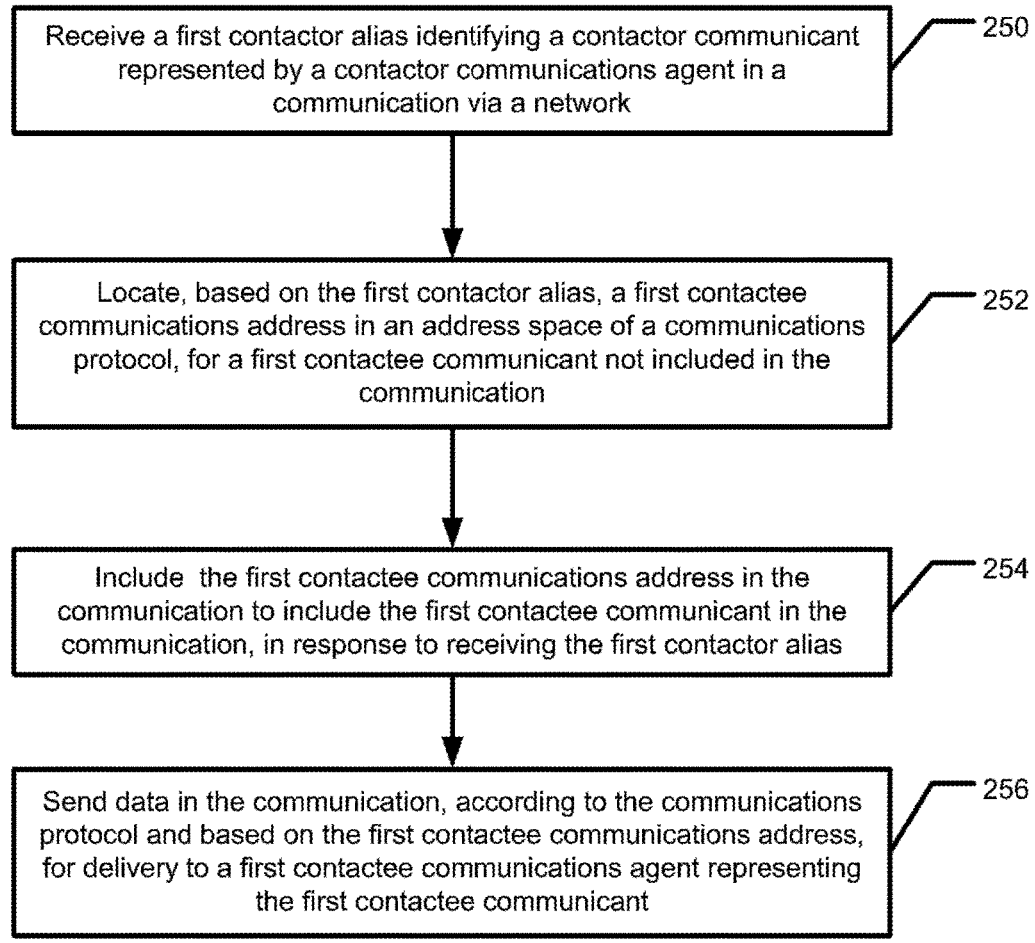
FIG. 2 is a flow diagram illustrating a method for identifying a contactee in a communication according to an aspect of the subject matter described herein.
Figure 3:
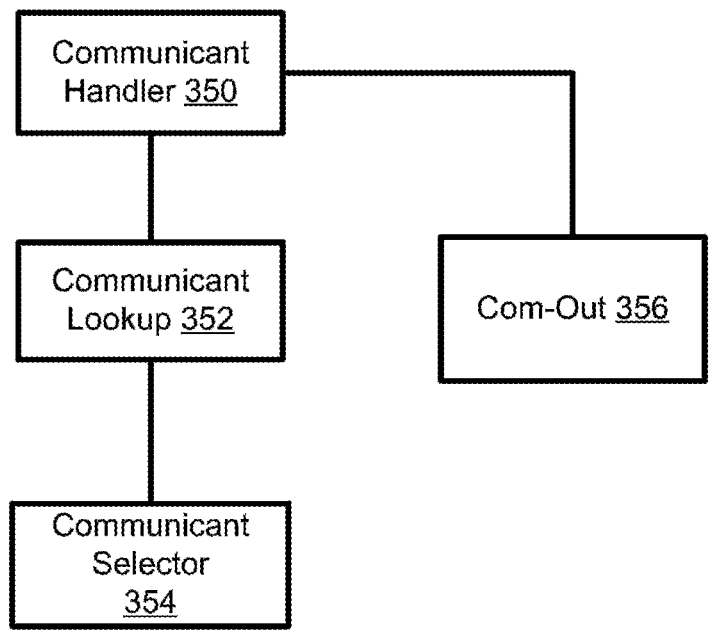
FIG. 3 is a block diagram illustrating an arrangement of components for identifying a contactee in a communication according to an aspect of the subject matter described herein.
Figure 4A:
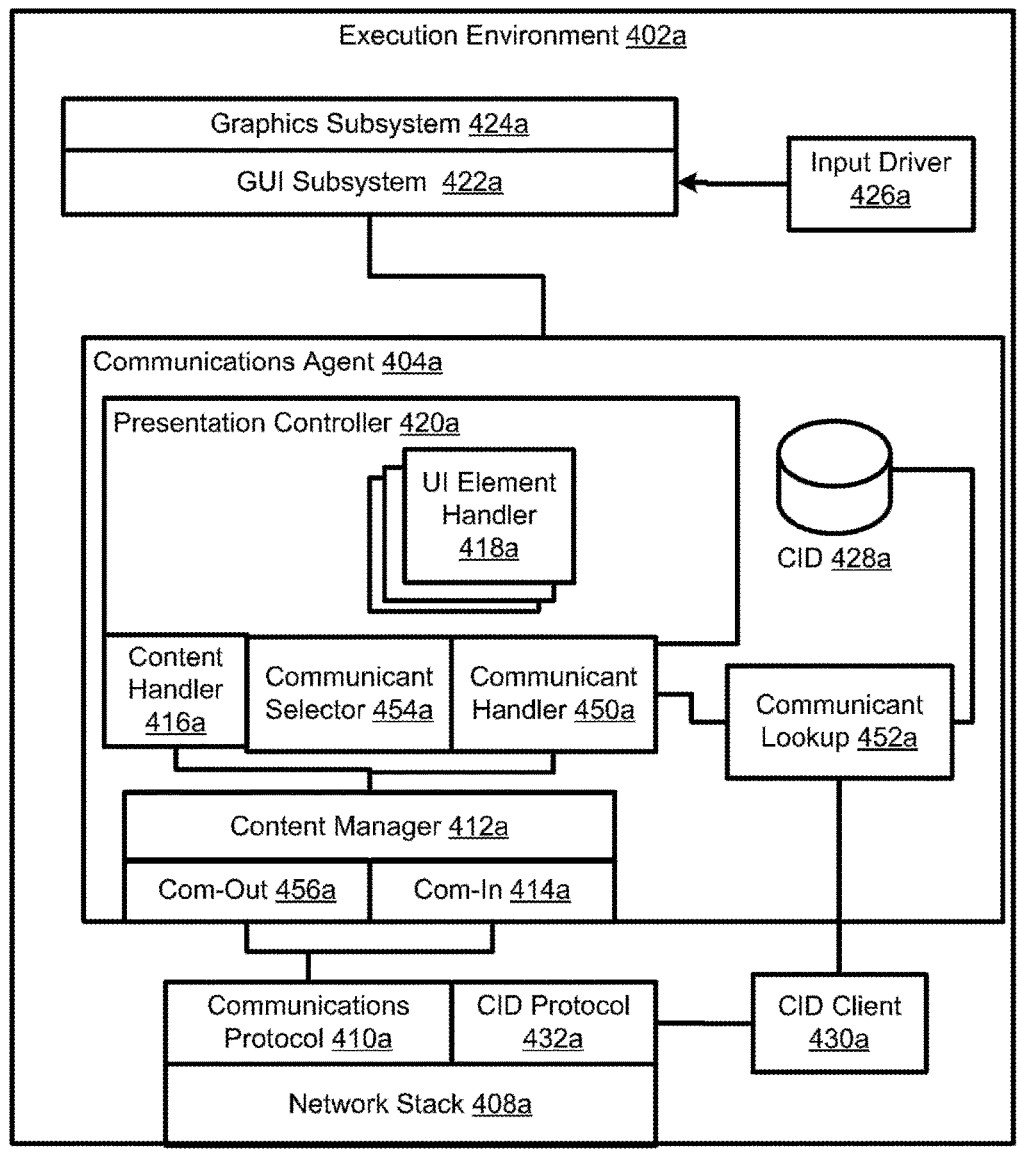
FIG. 4a is a block diagram illustrating an arrangement of components for identifying a contactee in a communication according to an aspect of the subject matter described herein.
Figure 4B:
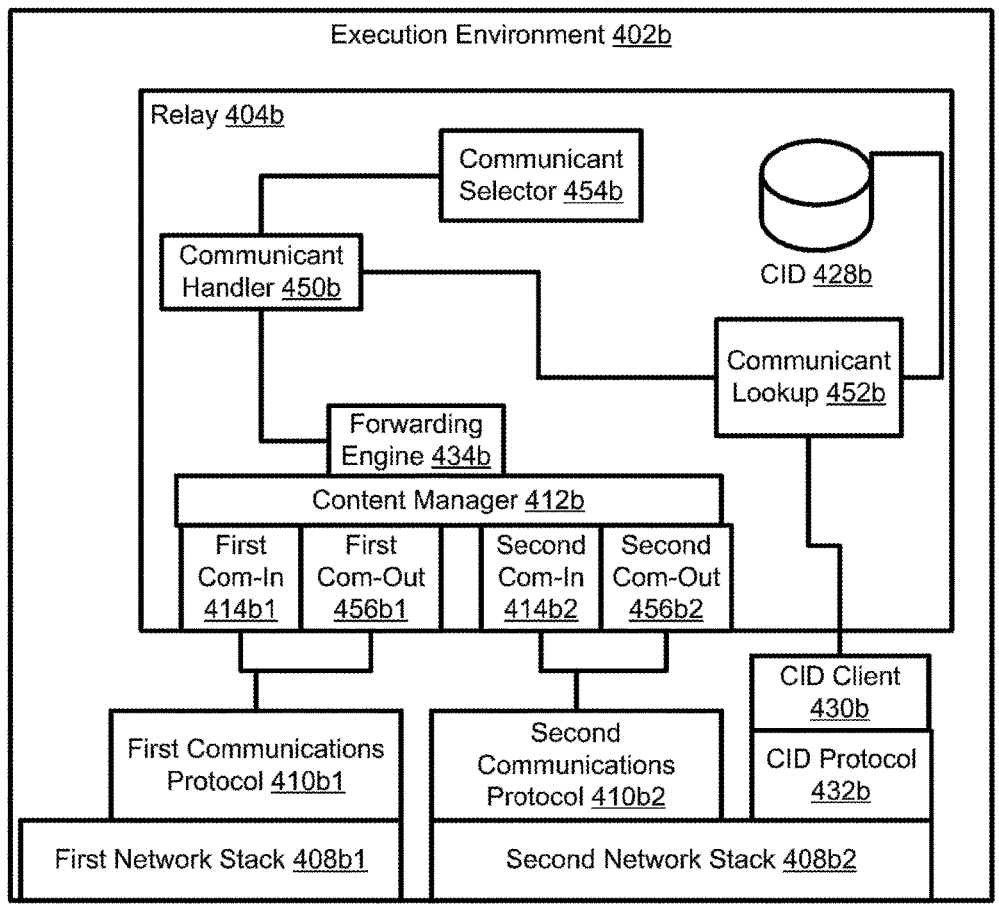
FIG. 4b is a block diagram illustrating an arrangement of components for identifying a contactee in a communication according to a aspect of the subject matter described herein.

The block diagram in FIG. 3 illustrates an exemplary system for identifying a contactee in a communication according to the method illustrated in FIG. 2. A system for performing the method illustrated in FIG. 2 includes an execution environment, including an instruction-processing unit, configured to process an instruction included in at least one of a communicant handler component 350, a communicant lookup component 352, a communicant selector component 354, and a com-out component 356 illustrated in FIG. 3. Some or all of the exemplary components illustrated in FIG. 3 may be adapted for performing the method illustrated in FIG. 2 in a number of execution environments. FIG. 4a and FIG. 4b each illustrate block diagrams including the components of FIG. 3 and/or analogs of the components of FIG. 3, respectively, adapted for operation in execution environment 402a and execution environment 402b including or otherwise provided by one or more nodes.

Execution environments and components of execution environments illustrated in FIG. 4a and FIG. 4b are identified by numbers including postfixes "a" and "b", respectively, to identify a component in a particular figure. The execution environments and included components are identified as a group and/or generically by the identifiers without the postfixes. For example, execution environment 402 may refer to both the execution environments in FIG. 4a and FIG. 4b and/or may refer generically to any execution environment that includes an adaption and/or analog of an arrangement of components for performing the method illustrated in FIG. 2.

FIG. 1 illustrates components of an exemplary node that may at least partially provide and/or otherwise be included in an execution environment. The components illustrated in FIG. 4a and FIG. 4b may be included in or otherwise combined with the components of FIG. 1 to create a variety of arrangements of components according to the subject matter described herein.

Figure 5:
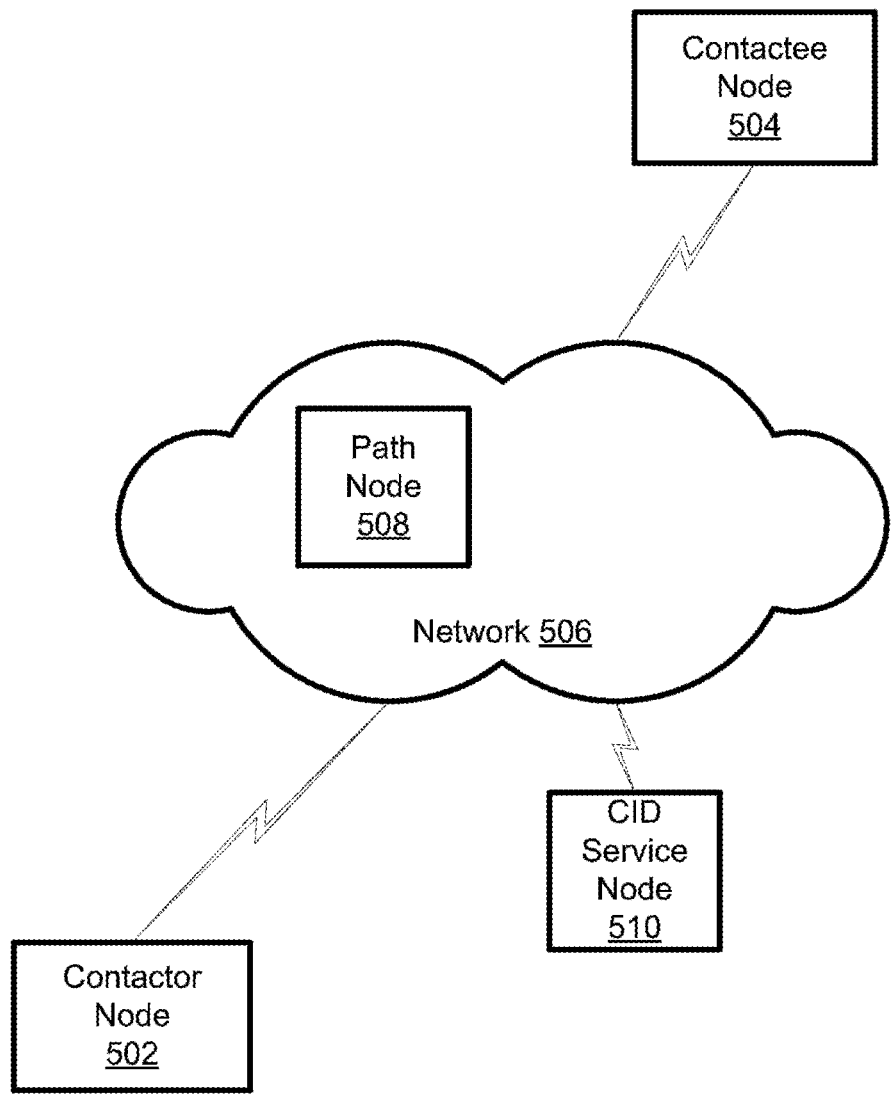
FIG. 5 is a network diagram illustrating an exemplary system for identifying a contactee in a communication according to an aspect of the subject matter described herein.

FIG. 5 illustrates contactor node 502 as an exemplary device included in and/or otherwise adapted for providing execution environment 402a in FIG. 4a. As illustrated in FIG. 5, contactor node 502 and contactee node 504 are operatively coupled to network 506 via respective network interface components enabling contactor node 502 and contactee node 504 to exchange data in a communication on behalf of communicants represented and/or included in the respective nodes. FIG. 5 also illustrates path node 508 in network 506. Path node 508 illustrates a node in a network path for operatively coupling contactor node 502 and contactee node 504, in an aspect of the subject matter described herein. Path node 508 may be included in and/or otherwise adapted for providing execution environment 402b in FIG. 4b.

FIG. 4a illustrates execution environment 402a hosting communications agent 404a. Communications agent 404a in FIG. 4a illustrates a communications agent that may represent a contactor communicant, also referred to as a "contactor", in a communication and may represent a contactee communicant, also referred to as a "contactee" in a communication. The terms "contactor" and "contactee" identify roles in a communication. A "contactor" provides information for identifying a "contactee" in a communication. A contactee may be included in a communication by a contactor and/or the contactor's communications agent. A contactor and/or a contactee is a user of a communications agent and may be a living being, a node, a component, and/or an application. Both a contactor and a contactee are communicants in a communication.

Components in FIG. 4a are referenced, in some locations in the description herein, to describe a communications agent operating in an execution environment of contactor node 502 and are referenced in some locations to describe a communications agent operating in an execution environment of contactee node 504. Exemplary communications agents include email clients, phone clients including Voice over Internet Protocol (VoIP) clients, instant messaging clients, short message service (SMS) clients, multimedia message service (MMS clients), and/or other multimedia communications clients including video-phone clients Communications agent 404a in FIG. 4a includes an adaptation of the arrangement of components in FIG. 3. Communications agent 404a may operate, in contactor node 502, on behalf of a contactor to communicate with a contactee represented by a communications agent operating in contactee node 504.

FIG. 4b illustrates relay component 404b configured to operate on behalf of contactor node 502 in FIG. 5, of communications agent 404a in contactor node 502, and/or of the contactor represented by communications agent 404a operating as contactor(s) with respect to relay component 404b. FIG. 4b illustrates another adaptation of the arrangement of components in FIG. 3 operating in relay component 404b. Exemplary relay components include email gateways, instant messaging relays, and voice switches that may operate in path nodes servicing communications agents, such as those listed in the previous paragraph.

As stated, the various adaptations of the arrangement in FIG. 3 illustrated and described herein are not exhaustive. For example, those skilled in the art will understand based on the description herein that arrangements of components for performing the method illustrated in FIG. 2 may be distributed across more than one node and/or execution environment. For example, such an arrangement may operate at least partially in a user node such as contactor node 502 and at least partially in a relay node such as path node 508.

FIG. 4a and FIG. 4b illustrate network stacks 408 configured for sending and receiving data in a communication via network 506 in FIG. 5. Contactor node 502, contactee node 504, and path node 508 may be operatively coupled to network 506 via respective network interface components. In an aspect, one or more communications between contactor node 502 and contactee node 504 may be exchanged via path node 508 based on the operation of relay component 404b. The network stacks in contactor node 502, contactee node 504, and path node 508 may support the same protocol suite, such as TCP/IP, or may communicate via a network gateway or other protocol translation device and/or service.

Relay component 404b in path node 508, in an aspect, may operate as a protocol gateway. In another aspect, delivery of a communication between contactor node 502 and contactee node 504 may not include path node 508. Network 506 may include a direct physical layer link between contactor node 502 and contactee node 504. Contactor node 502 and contactee node 504 may communicate via one or more nodes, in network 506, that operate without knowledge of a communications protocol for communicating between communications agents that are operating, respectively, in contactor node 502 and in contactee node 504. For example, a layer-2 switch or a layer-3 router may operate below a communications protocol layer that may operate at and/or otherwise may operate in a session layer, presentation layer, and/or application layer of a network.

Communications agents in contactor node 502 and in contactee node 504 in FIG. 5 may interoperate via their respective network stacks 408. The communications agents may communicate via one or more communications protocols. Communications agent 404a in FIG. 4a illustrates communications protocol component 410a illustrating a subsystem for communicating via network 506 according to one or more communications protocols, such as simple mail transfer protocol (SMTP); an instant messaging protocol, such as XMPP-IM; and/or a real-time voice and/or video protocol, such as real-time transport protocol (RTP). A communication between communications agents, respectively, operating in contactor node 502 and contactee node 504 may include more than one type of data or content type and may use one or more communications protocols for communicating the one or more content types via network 506.

FIG. 4b illustrates that relay component 404b in path node 508 may communicate with communications agents in contactor node 502 and contactee node 504, respectively, via one or more communications protocols through the operation of one or more communications protocol components 410b. Communications protocol component(s) 410b may be configured to interoperate with network stack(s) 408b to communicate via network 506. FIG. 4b illustrates communications protocol component 410b as including a first communications protocol component 410b1 for communicating with a communications agent in contactor node 502 via first network stack 408b1. FIG. 4b also illustrates communications protocol component 410b as including a second communications protocol component 410b2 for communicating with a communications agent in contactee node 504 via second network stack 408b2.

In various aspects a path node may include one or more network stacks, one or more communications protocol layers, and/or one or more network interface components. In FIG. 4b, first network stack 408b1 and second network stack 408b2 may include components for communicating via the same and/or different physical layer protocol(s), link layer protocol(s), network layer protocol(s), and/or other protocol(s) to support a communications protocol. Analogously, first communications protocol component 410b1 and second communications protocol component 410b2 may support one or more communications protocols. First communications protocol component 410b1 may operate according to the same communications protocol(s) as second communications protocol component 410b2. Alternatively or additionally, first communications protocol component 410b1 may operate according to one or more different communications protocol(s) than second communication protocol component 410b2.

Whether a communication from communications agent 404a in contactor node 502 is delivered to the communications agent in contactee node 504 via relay component 404b in path node 508 or not, data in the communication may be exchanged via discrete packets, a request/reply protocol, a data-streaming protocol, a session-oriented and/or connection-oriented protocol, a connectionless protocol, a real-time communications protocol, an asynchronous communication, a store and forward communications protocol, a reliable delivery communications protocol, a best-effort delivery communications protocol, a secure protocol and/or an unsecure protocol; to name a few communications options available according to various communications protocols.

FIG. 4a illustrates communications agent 404a including content manager component 412a. Content manager component 412a may interoperate with communications protocol layer component 410a and/or network stack 408a to receive data in one or more communications via network 506 with another communications agent in another node. Content manager component 412a is operatively coupled, via com-in component 414a, to communications protocol component 410a for receiving the data from the other node.

Data received in a communication may include data with one or more content types. Exemplary content types include plain text, markup such as hypertext markup language (HTML), audio data, image data, and/or executable data such as script instruction(s), byte code, and/or machine code. In FIG. 4a, communications agent 404a includes one or more content handler components 416a to process data received according to its content type.

A data type may be identified by a MIME type identifier and/or other schema identifier. Exemplary content handler components 416a include a text/html content handler component for processing HTML representations; an application/xmpp-xml content handler component for processing XMPP streams including presence tuples, instant messages, and audio content handlers including and/or configured to retrieve suitable codices; one or more video content handler components for processing video representations of various types; and still image data content handler components for processing various image data representations.

Content handler component(s) 416a process received data representations and may provide transformed data from the representations to one or more user interface element handler components 418a. One or more user interface element handler components 418a are illustrated in presentation controller component 420a in FIG. 4a. Presentation controller component 420a may manage visual, audio, and other types of output for its including application as well as receive and route detected user and other inputs to components and extensions of its including application, communications agent 404a.

With respect to FIG. 4a, a user interface element handler component 418a may be adapted to operate at least partially in a content handler component 416a such as a text/html content handler component and/or a script content handler component. Additionally or alternatively, a user interface element handler component in execution environment 402a may be received in a communication. For example, a communication, such as an email, may include an HTML content type portion and a script content type portion.

Figure 6:
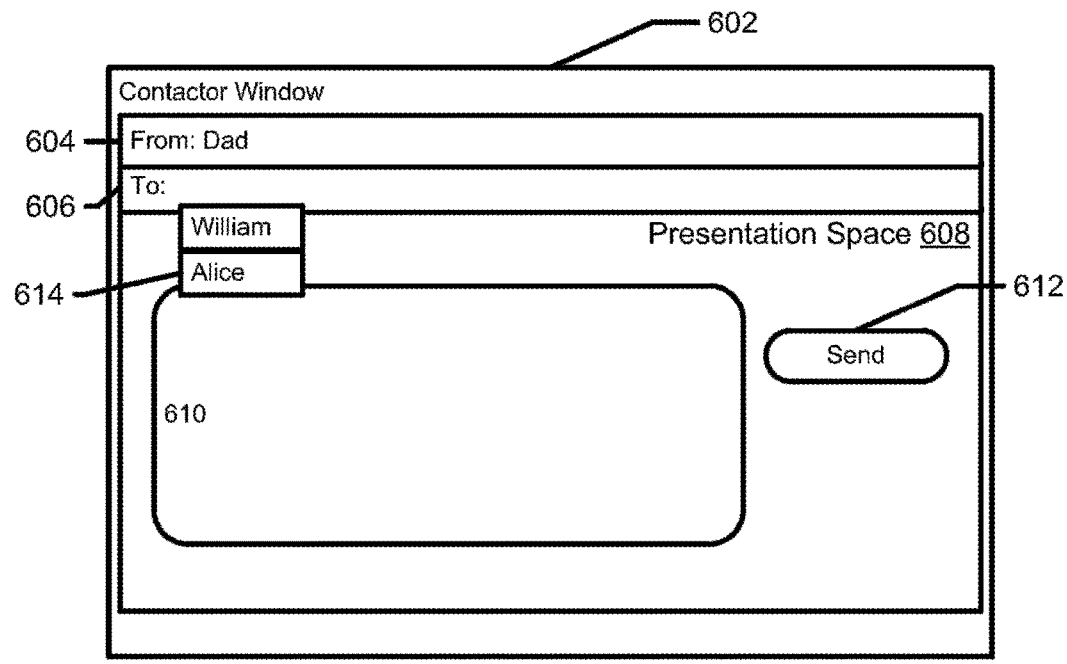
FIG. 6 is a diagram illustrating a user interface presented via a display according to an aspect of the subject matter described herein.

FIG. 6 illustrates an exemplary contactor window 602 presentable in a presentation space of a display device, such as output device 130 in FIG. 1. Contactor window 602 includes a contactor user interface (UI) element 604 for presenting an identifier of a contactor included in a communication represented by contactor window 602. Contactor window 602 also includes a contactee UI element 606 for presenting one or more contactee identifier(s) identifying one or more contactee(s) included in the communication. Presentation space 608 is provided by contactor window 602 for presenting a message UI element 610 for presenting a message addressed to one or more contactees identified in contactee UI element 606. Presentation space 608 may also be provided for presenting one or more UI controls for exchanging data in and/or otherwise managing a communication. Send UI element 612 illustrates an exemplary UI control for sending data in the communication to one or more identified contactees.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the exemplary elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user detectable representation of the program entity by an output device, such as a display. A "program entity" is an object included in and/or otherwise processed by an application or executable program component. The user detectable representation is presented based on the sent information. The sent information is referred to herein as "presentation information". Presentation information may include data in one or more formats including image formats such as JPEG, video formats such as MP4, markup language data such as HTML and other markup based languages, and/or instructions such as those defined by various script languages, byte code, and/or machine code. For example, a voice communication for receiving by a communications agent and/or for sending by a communications agent may be included in a media container having a specified format, such as MPEG4, and may be compressed, encrypted, and/or otherwise encoded.

The data is communicated for presenting in and/or by one or more user interface elements included in a user interface of a communications agent. Components configured to send information representing one or more program entities for presenting particular types of output by particular types of output devices include visual interface element handler components, audio interface element handler components, tactile interface element handler components, and the like.

A representation of a program entity may be represented and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in processor memory, secondary storage, a memory of an output device adapter device, and/or a storage medium of an output device. A screen of a display, for example, is a presentation space.

As used herein, the terms "program", "program component", "application", "application component", "executable", and "executable component" refer to any data representation that may be translated into a set of machine code instructions and optional associated program data. Thus, a program or executable may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which the term "object code" is used will make clear the state of the object code when it is relevant.

Various user interface elements illustrated in FIG. 6 presented by communications agent 404*a* in FIG. 4*a* may be presented by one or more user interface element handler components 418*a*. User interface element handler component(s) 418*a* in FIG. 4*a* may send presentation information representing visual interface element(s), such as contactor UI element 604 in FIG. 6, to GUI subsystem 422*a*. GUI subsystem 422*a* may instruct graphics subsystem 424*a* to draw the visual interface element(s) in a region of an output device included in execution environment 402*a* of contactor node 502 based on the presentation information received in and/or generated from data received in the communication.

Input may be received via input driver 426*a* in FIG. 4*a*. For example, a user may move a mouse to move a pointer presented in a display of contactor node 502 over send UI element 612. The user may provide an input detected by the mouse. The detected input may be received by GUI subsystem 422*a* via input driver 426*a* as a send command indicator based on the association of the shared location of the pointer and the send UI element 612 in the presentation space of the display.

Data to send in a communication to a communications agent in contactee node 504 may be received by one or more content handler component(s) 416*a* operating in contactor node 502 to transform the data into one or more representations suitable for transmitting in the communication and/or suitable for processing by the communications agent in contactee node 504. The one or more data representations may be provided to content manager component 412*a* for sending in the communication to contactee node 504. Content manager component 412*a* may package the one or more data representations in a message formatted according to the communications protocol. Communications protocol component 410*a* may send the data according to the specification(s) of the communications protocol. Content manager component 412*a* may alternatively or additionally encode and/or otherwise transform one or more of the data representations for sending in a data stream such as voice stream and/or a video stream for communicating in the communication to the communications agent.

Content manager component 412*a* operating in execution environment 402*a* included in and/or otherwise provided by contactor node 502 may provide the packaged, encoded, and/or transformed data to communications protocol component 410*a* via com-out component 456*a*. Com-out component 456*a* as described above operatively couples communications agent 404*a* to communications protocol component 410*a* according to an interface provided by communications protocol component 410*a* for sending data in a communication according to a communications protocol. Communications protocol component 410*a* may further package and/or otherwise transform the data to send via network stack 408a for delivery via network 506 to contactee node 504.

As described above, a communications protocol may operate via one or more nodes in a network in a network path including a contactor node and a contactee node. Exemplary path nodes include mail relay nodes, phone switch nodes, and proxy nodes such as instant messaging proxies for communicating through firewalls. As indicated, path node 508 including and/or otherwise providing execution environment 402b illustrates such a node. Data in a communication from contactor node 502 may be received via first network stack 408b1 and first communications protocol component 410b1 from network 506. First communications protocol component 410b1 may strip off communications protocol information, un-package, repackage, and/or otherwise transform data received in the communication for routing to content manager component 412b. In an aspect, a contactee communications address in an address space of the communications protocol may be included and/or otherwise identified by the communication.

Content manager component 412b may provide information to forwarding engine component 434b for determining a route to relay the data received in the communication to contactee node 504. Forwarding engine component 434b may determine some or all of a route to contactee node 504 according to the communications protocol and/or based on a separate routing protocol. Based on the determination by forwarding engine component 434b, content manager component 412b may determine a next node in a network path for delivering the data to contactee node 504 and/or may identify a network interface component for sending the data in the communication to a next node. Content manager component 412b may identify second com-out component 456b2 for relaying the data to the next node. The next node may be contactee node 504 or may be another path node. Second com-out 456b2 may interoperate with second communication component 410b2 to relay the data in the communication to network 506 for delivery to the communications agent in contactee node 504.

Sending data in a communication requires identifying a contactee. A contactee may be represented by a communications address in an address space of a communications protocol.

With reference to FIG. 2, block 250 illustrates that the method includes receiving a first contactor alias identifying a contactor communicant represented by a contactor communications agent in a communication via a network. Accordingly, a system for identifying a contactee in a communication includes means for receiving a first contactor alias identifying a contactor communicant represented by a contactor communications agent in a communication via a network. For example, as illustrated in FIG. 3, communicant handler component 350 is configured for receiving a first contactor alias identifying a contactor communicant represented by a contactor communications agent in a communication via a network. FIG. 4a and FIG. 4b illustrate communicant handler component 450a and communicant handler component 450b as adaptations and/or analogs of communicant handler component 350 in FIG. 3. One or more communicant handler components 450a operate in execution environment 402a, and one or more communicant handler components 450b operate in execution environment 402b.

In one aspect, a contactor communicant alias, also referred to as a contactor alias, may be received from a user/communicant of a communications agent in a user node. In FIG. 4a, presentation controller 420a and/or a UI element handler 418a, presenting and/or managing interaction with contactor UI element 604 in FIG. 6 for contactor node 502, may receive a contactor alias in response to a user input corresponding to UI element handler 604. The user/communicant of contactor node 502 may enter a contactor alias, such as "Dad", via a keyboard and/or select a predefined communicant alias presented in a selection UI control element via a UI element handler component 418a. The user input may be detected by input driver 426a. Corresponding input information may be routed to presentation controller 420a by GUI subsystem 422a as described above.

Input information identifying the contactor alias based on the detected input may be provided to communicant handler component 450a according to an interface operatively coupling presentation controller component 420a and communicant handler component 450a. Communicant handler component 450a may look up additional information about the contactor based on the contactor alias. For example, communicant handler component 450a may retrieve the additional information from a directory or database. FIG. 4a illustrates a communicant information directory (CID) 428a accessed by communicant handler component 450a via communicant lookup component 452a. The additional information may include one or more communications addresses from one or more communications address spaces of one or more communications protocols for various types of communications. The additional information may include another communicant alias for the contactor that communications agent 404a may present in contactor UI element 604 and/or may include in the communication represented in FIG. 6.

Additionally or alternatively, some or all of the additional information may be maintained by CID service node 510 and accessed by communicant lookup component 452a via CID client component 430a. CID client component 430a may interoperate with a CID service operating in CID service node 510 via CID protocol component 432a according to a protocol specification for accessing and providing CID services over a network.

In another aspect, a contactor alias may be received via a network from a component and/or node operating in the role of a contactor. In FIG. 4b, content manager component 412b may receive a contactor alias in data sent from contactor node 502. The data may be sent to initiate a communication session and/or connection when required by a communications protocol for the communication, such as voice communication between a contactor and a contactee including an RTP session. The data may be sent without a session and/or a connection between contactor node 502 and contactee node 504. For example, an email communication may not require a connection and/or a session.

The data identifying the contactor alias may be received from network 506 via network stack 408b and/or by communications protocol component 410b. Content manager component 412b may include one or more com-in component(s) 414b for receiving data in various communications from one or more communications protocol component(s) 410b. For example, path node 508 may include a network interface component physically coupled to a first portion of network 506 including contactor node 502 and another network interface component physically coupled to a second portion of network 506 including contactee node 504. The data including the contactor communicant alias may be received by content manager component 412b via first com-in component 414b1.

As described above, content manager component 412*b* may invoke forwarding engine component 434*b* to determine one or more routes for relaying the received data and/or for sending data for establishing a session and/or connection with a contactee node. In an aspect, when a contactor alias is received from a contactor node, forwarding engine component 434*b* may identify the contactor alias to communicant handler component 450*b*. Communicant handler component 450*b* may receive the contactor alias as received by content manager component 412*b* and/or as transformed for processing by content manager component 412*b*, forwarding engine component 434*b*, and/or other component(s) in execution environment 402*b* included in processing contactor alias information.

Communicant handler component 450*b* may look up additional information about the contactor based on the contactor alias as described above with respect to the communicant handler component 450*a*. Communicant handler component 450*b* may retrieve the additional information from local CID 428*b* accessed by communicant handler component 450*b* via communicant lookup component 452*b*. Additionally or alternatively, some or all of the additional information may be maintained by CID service node 510 and accessed by communicant lookup component 452*b* via CID client component 430*b* communicating with CID service node via CID protocol component 432*b* in a manner analogous to that described above with respect to CID client component 430*a* in FIG. 4*a*.

Returning to FIG. 2, block 252 illustrates that the method further includes locating, based on the first contactor alias, a first contactee communications address in an address space of a communications protocol, for a first contactee communicant not included in the communication. Accordingly, a system for identifying a contactee in a communication includes means for locating, based on the first contactor alias, a first contactee communications address in an address space of a communications protocol, for a first contactee communicant not included in the communication. For example, as illustrated in FIG. 3, communicant lookup component 352 is configured for locating, based on the first contactor alias, a first contactee communications address in an address space of a communications protocol, for a first contactee communicant not included in the communication. FIG. 4*a* and FIG. 4*b* illustrate communicant lookup component 452*a* and communicant lookup component 452*b* as adaptations and/or analogs of communicant lookup component 352 in FIG. 3. One or more communicant lookup components 452*a* operate in execution environment 402*a*, and one or more communicant lookup components 452*b* operate in execution environment 402*b*

In addition to and/or instead of retrieving some or all of the additional information for the contactor, communicant handler component 450*a* may identify and/or otherwise provide access to the received contactor alias to communicant lookup component 452*a* to locate a communications address for one or more contactees to include in the communication. A matching criterion for locating the one or more communications addresses may be included in a communications agent's instructions, received as configuration information for a communications agent, specified by a user, and/or determined dynamically based on a change detectable within an execution environment including a communicant lookup component and/or analog.

FIG. 6 illustrates an aspect in which a contactor alias identifies multiple contactee communications addresses. In FIG. 4*a*, CID 428*a* may include a contact list identified by the contactor alias "Dad". A contact list may include contact entries for contactee(s) that may interact with a contactor in an identifiable context such as a group, relationship, and/or role. "Dad" may identify a contact list of communicants that interact with the contactor as a father, in general, and/or as their father, in particular. FIG. 6 illustrates a contactee selection list 614 presenting names as contactee aliases of the contactor's children located based on the contactor alias "Dad".

In another aspect, a particular contactee or contactee type may be located based on a contactor alias. For example, a contactor alias "employee" may be configured by a user of contactor node 502 and/or by an administrator in an organization in which the contactor works to identify the contactor's manager. A record associating a contactor alias "employee" for one or more employees in the organization with one or more corresponding managers of the one or more employees may be maintained in a directory service accessible to contactor node 502 and optionally to other nodes of other employees. The record may identify a communications address of a manager of an employee by including the communications address and/or by referencing the communications address, directly and/or indirectly. FIG. 4*a* illustrates CID client component 430*a* for accessing a CID service via a network. FIG. 5 illustrates CID service node 510 configured to host a CID service.

Returning to FIG. 2, block 254 illustrates that the method yet further includes including the first contactee communications address in the communication to include the first contactee communicant in the communication, in response to receiving the first contactor alias. Accordingly, a system for identifying a contactee in a communication includes means for including the first contactee communications address in the communication to include the first contactee communicant in the communication, in response to receiving the first contactor alias. For example, as illustrated in FIG. 3, communicant selector component 354 is configured for including the first contactee communications address in the communication to include the first contactee communicant in the communication, in response to receiving the first contactor alias. FIG. 4*a* and FIG. 4*b* illustrate communicant selector component 454*a* and communicant selector component 454*b* as adaptations and/or analogs of communicant selector component 354 in FIG. 3. One or more communicant selector components 454*a* operate in execution environment 402*a*, and one or more communicant selector components 454*b* operate in execution environment 402*b*.

In FIG. 4*a* and/or in FIG. 4*b*, communicant selector component 454 may automatically identify and include one or more contactee communications addresses located by communicant lookup component 452. In the example where contactor alias "employee" is associated with the contactor's manager, communicant selector component 454 may automatically include the contactor's manager in the communication by including a communications address of the manager contactee in the communication to identify a communications agent for a communicant in the role of the contactor's manager as a contactee communications agent. The particular address may be determined automatically based on the communications agent. For example, if the communications agent is an email client, a business email address of the contactor's manager may be automatically selected from information in CID 428 and/or CID service node 510.

In another aspect, communicant selector component 454 in FIG. 4*a* and/or in FIG. 4*b* may include a located contactee communications address in the communication in response to a user input. In FIG. 6, a user input for selecting "William" may be detected by a UI element handler component for contactee selection list 614. The selected contactee communicant alias may be identified to communicant selector component 454 in FIG. 4a and/or in FIG. 4b to identify a contactee communications address to include "William" in the communication. A contactee may have more than one communications address that is suitable for a particular communication.

Communicant selector component 454 in FIG. 4a and/or in FIG. 4b may interoperate with presentation controller component 420a to receive a user input identifying one or more of the communications addresses to include the contactee in the communications. Communicant selector component 454 may automatically identify a communications address from multiple communications addresses for a contactee based on the received contactee communicant alias. "Dad" not only identifies a role of the contactor. "Dad" may identify a communications relationship. Communicant selector component 454 may select a home or family communications address for "William".

Further, communicant selector component 454 may identify and automatically select a home or family communications address for the communication for the contactor based on the received contactor alias. A contactor communications address may be selected based on a contactee's communications address and vice versa.

When an ambiguity is detected during automatic selection or when automatic selection is not supported, communicant selector component 454 may interoperate with presentation controller 420a to receive user data to resolve the ambiguity. In an aspect, communicant selector component 454 may resolve an ambiguity based on a user-configurable policy. A policy may be based on an order of a communicant alias and/or communications address in a plurality of communications identifiers, a frequency of use of a communications address, and/or any other suitable criterion.

Returning to FIG. 2, block 256 illustrates that the method yet further includes sending data in the communication, according to the communications protocol and based on the first contactee communications address, for delivery to a first contactee communications agent representing the first contactee communicant. Accordingly, a system for identifying a contactee in a communication includes means for including the first contactee communications address in the communication to include the first contactee communicant in the communication, in response to receiving the first contactor alias. For example, as illustrated in FIG. 3, com-out component 356 is configured for sending data in the communication, according to the communications protocol and based on the first contactee communications address, for delivery to a first contactee communications agent representing the first contactee communicant. FIG. 4a and FIG. 4b illustrate com-out component 456a and com-out component 456b as adaptations and/or analogs of com-out component 356 in FIG. 3. One or more com-out components 456a operate in execution environment 402a, and one or more com-out components 456b operate in execution environment 402b.

Data may be sent in a communication according to a form or type of the communication and/or other attribute of the communication such as a security attribute, the amount of data to be set, a priority setting, a task setting, and the like. Some forms of communication do not require a session and/or connection between a contactor node and a contactee node in order to send data between the two nodes, while others do. An email and/or instant message may use a store and forward model of delivery.

Data may be sent in a communication in response to a communicant input. A contactor may provide an input corresponding to send UI element 612 in FIG. 6. The input may be received by presentation controller component 420a and/or one or more UI element handlers 418a corresponding to send UI element 612. In response to detecting the input, presentation controller component 420a may provide data to be sent in the communication to one or more content handler components 416a according to the content type(s) of the data to be sent.

The one or more content handler components 416a may encode, format, and/or otherwise transform the data for sending in a message, such as an email message. The one or more content handler components 416a may provide data to be sent to content manager 412a, instructing content manager component 412a to send the data in the communication for delivery to a communications agent in contactee node 504. Content manager component 412a interoperating with com-out component 456a may further format and/or transform the data for sending in the communication according to communications protocol, for example according to an email communications protocol, by communications protocol component 410a. Communications protocol component 410a may send the communication for delivery to the communications agent in contactee node 504 via network 506.

Path node 508 may represent contactor node 502 in a communication. For example, in response to including a located contactee communications address in a communication, communicant selector component 454b may invoke and/or otherwise return control to forwarding engine component 434b. Forwarding engine component 434b may determine a next node and/or a network interface in execution environment 402b for sending data in the communication for delivery to contactee node 504 via network 506.

The data to be sent in the communication may or may not require encoding, decoding, securing, and/or otherwise transforming for sending. In an aspect, relay component 404b may operate as a proxy receiving and relaying data in a communication based on a same communications protocol for receiving the data and for relaying the data. The data may be relayed as received. In another aspect, data may be received via a secure portion of network 506 so that encryption of data is not required. Forwarding engine component 434b may identify a network path for relaying data that is at least partially unsecured. Relay component 404b may include a content handler (not shown) for encrypting some or all of the data to be sent. Further, data may be received by relay component 404b according to a first communications protocol, for example, via first network stack 408b1 and first communications protocol component 410b1. Forwarding engine component 434b may determine a route to a next node communicatively coupled to path node 508 via a second, different communications protocol supported by second communications protocol component 410b2. Content manager component 412b and send the data to the next node via second network stack 408b2, which may or may not share components with first network stack 408b1.

Content manager component 412b directed by forwarding engine component 434b may send data in the communication via a com-out component, such as second com-out component 456b2 identified directly and/or indirectly by forwarding engine component 434b in determining a network interface component and or next node for sending the data in the communication.

For session-oriented and/or connection-oriented communication a session and/or connection must be established if a session/connection has not already been established. Data may be sent for delivery to a communications agent identified based on a contactee communications address during session and/or connection setup. For example, for a voice communication a voice communication may be established via a session initiation protocol. Communications protocol component 410a may operate according to the session initiation protocol specifications. Communications protocol component 410a operating in contactor node 502 may locate a communications agent by communicating with one or more nodes in network 506 according to the session initiation protocol. Communications protocol component 410a may locate a communications agent in contactee node 504, based on a communications address for the contactee located based on the contactor alias.

Once a communication session is established, such as a voice session, data may be sent according to the session communications protocol, such as RTP. Data may be sent according to the session initiation protocol in the communication for managing the voice communication session and/or for exchanging text, image, and/or other data outside of the voice session. Path node 508 may be included in session and/or connection setup. Alternatively or additionally, path node 508 may be included in a network path in a session and/or connection.

The method illustrated in FIG. 2 may include additional aspects supported by various adaptations and/or analogs of the arrangement of components in FIG. 3. In one aspect, receiving the contactor communicant alias may include receiving the contactor communicant alias in a previous communication via a network. The previous communication may be from a previous communications agent representing a previous communicant. For example, a communicant represented by contactee node 504 may identify a communicant represented by contactor node 502 by a communicant alias assigned by the communicant of the contactee node 504. The contactee communicant may direct a task and associate a communicant alias with a communications address of the contactor communicant that identifies a role or responsibility of the contactor communicant in the task. The contactor communicant may select and/or otherwise identify the communicant alias to communicant handler component 450a operating in contactor node 502 for a subsequent communication with the contactee communicant. Based on receiving the task-based communicant alias, a contactee communicant alias received from the contactee and/or the contactee's communications address may be located and selected automatically to include the contactee communicant in the subsequent communication.

A communicant may be identified by multiple communicant aliases. The communicant aliases may include a second communicant alias for the contactor that may be received for locating a second contactee communications address based on the second contactor communicant alias. The second contactee communications address may be included in an address space of a communications protocol. The address space and/or the communications protocol may be the same as and/or different from than those associated with the first communicant alias.

A contactor communicant alias received for a communication may establish a context or an identifier space for locating and selecting a communications address and/or communicant alias for a contactee. Contactor node 502 may receive "Dad" or a home email, instant message, or phone number for a contactor represented by contactor node 502. The received communicant alias may limit potential contactees to those with family relationships or family business with the contactor. A contactor communicant alias may define and/or identify an identifier space for contactee communications addresses and/or contactee communicant aliases. Contactor node 502 may receive "teacher" or other communicant alias associated with an educational group. The communicant alias may establish an identifier space of potential contactees that differs from the family identifier space. Identifier spaces may include communications addresses and/or communicant aliases identifying the same communicant. A different contactee communications address and/or contactee communicant alias may be located and selected based on the contactor's identifier received for the communication.

As described above, a contactee communications address may be located automatically in response to receiving a contactor communicant alias. Further, a contactee communications address may be selected automatically, in response to receiving the contactor communicant alias and/or in response to locating the contactee communications address. In another aspect, also described above, locating a contactee communications address may include detecting an association that identifies a contactor communicant alias and a contactee communications address. Locating the contactee communications address may further include determining that the first contactee communications address matches the matching criterion. For example, CID 428 in FIG. 4a and/or FIG. 4b may include a record that includes a contactor communicant alias and includes a contactee communications address. The association may be indirect, in another aspect. The contactor communicant alias may identify a communications context, such as an identifier space. The communication context may include one or more communicant aliases for one or more potential contactees. The communicant aliases may identify one or more communications addresses for the contactee(s).

Locating a contactee communications address based on a contactor communicant alias may include determining that a specified matching criterion based on the communicant alias is met for the contactee address. The matching criterion may include the communicant alias and/or may be otherwise based on the first communicant alias as illustrated in the previous paragraph. The matching criterion may further be based on the data to be sent, the contactor communications agent, the communications protocol, an/or the address space. A subject, keyword, and/or content type of some or all of the data to be sent may affect the matching criterion and/or its evaluation for determining a match.

For example, a contactee may have more than one communications address. A contactor represented by an email communications agent may locate and/or determine that an email address meets a matching criterion. The matching criterion may require an email address based on the type of communication supported by the communications agent. In another example, a contactor may identify a media container to send to a contactee in a communication. A contactor node may identify a contactee node and identify a communications address for the contactee via a negotiation based on, for example, a session initiation protocol. The communications protocol and communications address for sending the data in the media container may be negotiated based on the content type of the media container.

As described above, an association between a contactor communicant alias and a contactee communications address may be included in a contact list identified based on the contactor communicant alias. The contact list may include a contact item identifying the contactee communications address. A contactee list item may identify one or more contactee communications addresses for a contactee. Locating a contactee communications address may include locating more than one contactee communications addresses that meet a matching criterion based on a received contactor communicant alias for a communications. The contactee communications addresses may identify more than one contactee communicant. CID 428 and/or CID service node 510 may maintain one or more contact lists. Communicant lookup component 452 in FIG. 4a and/or in FIG. 4b may locate a contactee list item by performing a search or lookup based on the contactor communicant alias.

A contactee communications address may identify a contactee communicant alias for a contactee communicant. CID 428 and/or CID service node 510 may store information associating a communicant alias with a communications address. The contactee communicant alias may be sent for presenting to the contactor and/or the contactee. A communicant alias may identify a role, task, identifier space, and/or other context for the communication. As such, a contactee may be identified by more than one contactee communicant alias since a contactor and a contactee may communicate in various contexts for various purposes in various roles. A communicant alias for a contactor may identify the contactor communicant in a particular identifier space and/or context in some communications. An identifier space identified by a contactor communicant alias and an identifier space identified by a contactee communicant alias may be the same, different, and/or one may include part and/or all of the other.

Exemplary identifier spaces and/or identifier domain types, that may be specified to include a contactor communicant alias and/or a contactee communicant alias, include a business identifier space, a demographic identifier space, a familial identifier space, a financial identifier space, a political identifier space, a social identifier space, a group identifier space, a religious identifier space, an athletic identifier space, an educational identifier space, a security identifier space, a time-based identifier space, a task-based identifier space, a transaction-based identifier space, a geospatial identifier space, a hierarchical identifier space, a peer identifier space, an acyclic identifier space, a cyclic identifier space, a process identifier space, a system identifier space, a transactional identifier space, a privacy identifier space, an operational identifier space, a travel identifier space, a topic based identifier space, a service identifier space, and/or a field of knowledge identifier space.

The association between the first communicant alias and the first contactee communications address may be configured by a user. Alternatively or additionally, the association may be created and/or updated based on a previous communication between the contactor communicant and the contactee communicant. The previous communication may have exchanged data according to the same and/or different communications protocol than in the first communications. The contactor communications agent and/or the contactor communications agent may have been the same and/or different than in the first communication. The contactor node and the contactee node may have been the same nodes and/or different nodes than in the first communications. The role of contactor and/or contactee may have been associated with the same and/or different communicants than those associated with the roles in the first communication.

In another aspect, including the first contactee communications address may include presenting a first representation of the first contactee communicant to a user via an output device, in response to locating the first contactee communications address. A selection input from a user may be detected by a user interface handler component 418a and/or presentation controller component 420a. The selection input may correspond to the representation of the first contactee communicant presented to a user. The selection may be identified to communicant selector component 454a. The first contactee communications address may be included in the first communication, in response to detecting the selection input. Communicant selector component 454a may include the communications address identified based on the selection input in the communication for delivering data in the communication to a communications agent representing the contactee communicant. The first contactee communicant may be selected from more than one contactee communicant with selectable representations presented via the output device. The contactee communicants may be identified by corresponding contactee communications addresses that match a matching criterion based on the first contactor communicant alias.

Exemplary communications include an email, a fax, an audio (voice) communication, a video communication, a text communication, and/or an instant message.

The data sent in the communication may include the first contactor communicant alias to identify the contactor communicant and to identify a communication identifier space, including the first contactor communicant alias, to the first contactee communicant and/or the first contactee communications agent.

In yet another aspect, the first contactor communicant may be one of several contactor communicants represented by the communications agent. Sending the data may include sending the first contactor communicant alias to differentiate the first contactor communicant, from among the several other contactor communicants, to the contactee communicant.

The first contactee communications agent may represent more than one contactee communicant. For example, multiple communicants may share a communications address, such as a phone number and/or email address. Sending the data may include identifying a first contactee communicant alias based on the first contactee communications address and the first contactor communicant alias. The first contactee communicant alias may be sent in the data to identify the first contactee communicant from among the several represented by the first communications agent. Content manager component 412a may detect a portion of the data in the communication including a communicant alias. As described above, content manager component 412a may route the data to a suitable content handler component 416a for processing. The processing may include sending presentation information to an output device to present the communicant alias to a user.

Sending the data may include, in another aspect, identifying a first contactee communicant alias based on the first contactor communicant alias and the first contactee communications address. The first contactee communicant alias may be sent in the data to identify an identifier space including at least one of the first contactee communicant alias and the first contactor communicant alias.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer readable medium and execute the instructions for carrying out the described methods. A non-exhaustive list of conventional exemplary computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. An apparatus, comprising:
  a screen;
  an input device;
  at least one non-transitory memory storing instructions; and
  one or more processors in communication with the screen, the input device, and the at least one non-transitory memory, wherein the one or more processors execute the instructions to cause the apparatus to:
  display, utilizing the screen, a contactor window including:
    at least one contactor user interface element configured to have presented, in connection therewith, a plurality of contactor identifiers of a contactor communicant represented by a contactor email communications agent,
    at least one contactee user interface element configured to have presented, in connection therewith, at least one of a plurality of contactee identifiers of a plurality of contactee communicants each represented by a corresponding contactee email communications agent,
    a message user interface element configured to present a message addressed from one of the plurality of contactor identifiers of the contactor selected in connection with the at least one contactor user interface element and to one or more of the plurality contactees selected in connection with the at least one contactee user interface element, and
    a send user interface element configured to cause the message to be sent;
  receive, in connection with the at least one contactor user interface element of the contactor window and utilizing the input device, an indication of a selection of a first contactor identifier of the plurality of contactor identifiers identifying the contactor communicant represented by the contactor email communications agent;
  in response to the receipt, in connection with the at least one contactor user interface element of the contactor window and utilizing the input device, of the indication of the selection of the first contactor identifier of the plurality of contactor identifiers identifying the contactor communicant represented by the contactor email communications agent: display, in connection with the at least one contactor user interface element of the contactor window and utilizing the screen, the selected first contactor identifier of the plurality of contactor identifiers identifying the contactor communicant represented by the contactor email communications agent;
  based on the receipt, in connection with the at least one contactor user interface element of the contactor window and utilizing the input device, of the indication of the selection of the first contactor identifier of the plurality of contactor identifiers identifying the contactor communicant represented by the contactor email communications agent: cause a first subset of the plurality of contactee identifiers of the plurality of contactee communicants to be automatically identified, based on the selected first contactor identifier;
  after the identification, based on the selected first contactor identifier, of the first subset of the plurality of contactee identifiers of the plurality of contactee communicants: display, in connection with the at least one contactee user interface element of the contactor window and utilizing the screen, the first subset of the plurality of contactee identifiers of the plurality of contactee communicants;
  after the display, in connection with the at least one contactee user interface element of the contactor window and utilizing the screen, of the first subset of the plurality of contactee identifiers of the plurality of contactee communicants: receive, in connection with the at least one contactee user interface element of the contactor window and utilizing the input device, an indication of a selection of at least one of the first subset of the plurality of contactee identifiers of the plurality of contactee communicants;

in response to the receipt, in connection with the at least one contactee user interface element of the contactor window and utilizing the input device, of the indication of the selection of the at least one of the first subset of the plurality of contactee identifiers of the plurality of contactee communicants: display, in connection with the at least one contactee user interface element of the contactor window and utilizing the screen, the selected at least one of the first subset of the plurality of contactee identifiers of the plurality of contactee communicants;

display, in connection with the message user interface element of the contactor window and utilizing the screen, a first message;

receive, in connection with the send user interface element of the contactor window and utilizing the input device, an indication of a selection of the send user interface element for the first message;

in response to the receipt, in connection with the send user interface element of the contactor window and utilizing the input device, of the indication of the selection of the send user interface element for the first message: send the first message to at least one first contactee email communications address corresponding to the selected at least one of the first subset of the plurality of contactee identifiers of the plurality of contactee communicants;

receive, in connection with the at least one contactor user interface element of the contactor window and utilizing the input device, an indication of a selection of a second contactor identifier of the plurality of contactor identifiers identifying the contactor communicant represented by the contactor email communications agent;

in response to the receipt, in connection with the at least one contactor user interface element of the contactor window and utilizing the input device, of the indication of the selection of the second contactor identifier of the plurality of contactor identifiers identifying the contactor communicant represented by the contactor email communications agent: display, in connection with the at least one contactor user interface element of the contactor window and utilizing the screen, the selected second contactor identifier of the plurality of contactor identifiers identifying the contactor communicant represented by the contactor email communications agent;

based on the receipt, in connection with the at least one contactor user interface element of the contactor window and utilizing the input device, of the indication of the selection of the second contactor identifier of the plurality of contactor identifiers identifying the contactor communicant represented by the contactor email communications agent: cause a second subset of the plurality of contactee identifiers of the plurality of contactee communicants to be automatically identified, based on the selected second contactor identifier, the second subset of the plurality of contactee identifiers of the plurality of contactee communicants being different, at least in part, from the first subset of the plurality of contactee identifiers of the plurality of contactee communicants, such that selection of different contactor identifiers results in display of at least partially different contactee identifiers;

after the identification, based on the selected second contactor identifier, of the second subset of the plurality of contactee identifiers of the plurality of contactee communicants: display, in connection with the at least one contactee user interface element of the contactor window and utilizing the screen, the second subset of the plurality of contactee identifiers of the plurality of contactee communicants;

after the display, in connection with the at least one contactee user interface element of the contactor window and utilizing the screen, of the second subset of the plurality of contactee identifiers of the plurality of contactee communicants: receive, in connection with the at least one contactee user interface element of the contactor window and utilizing the input device, an indication of a selection of at least one of the second subset of the plurality of contactee identifiers of the plurality of contactee communicants;

in response to the receipt, in connection with the at least one contactee user interface element of the contactor window and utilizing the input device, of the indication of the selection of the at least one of the second subset of the plurality of contactee identifiers of the plurality of contactee communicants: display, in connection with the at least one contactee user interface element of the contactor window and utilizing the screen, the selected at least one of the second subset of the plurality of contactee identifiers of the plurality of contactee communicants;

display, in connection with the message user interface element of the contactor window and utilizing the screen, a second message;

receive, in connection with the send user interface element of the contactor window and utilizing the input device, an indication of a selection of the send user interface element for the second message; and in response to the receipt, in connection with the send user interface element of the contactor window and utilizing the input device, of the indication of the selection of the send user interface element for the second message: send the second message to at least one second contactee email communications address corresponding to the selected at least one of the second subset of the plurality of contactee identifiers of the plurality of contactee communicants;

wherein the apparatus is configured such that the contactor window includes a single email composition window configured to permit the contactor communicant to initiate a selection of the first contactor identifier or the second contactor identifier directly from the single email composition window and while the single email composition window includes at least a portion of the at least one contactor user interface element and at least a portion of the at least one contactee user interface element, so as to permit switching between the selection of the first contactor identifier and the second contactor identifier via the single email composition window, in order to permit a review, via the single email composition window, of a difference between the first subset and the second subset of the plurality of contactee identifiers of the plurality of contactee communicants.

2. The apparatus of claim 1, wherein the apparatus is configured such that the plurality of contactor identifiers include contactor addresses, and the plurality of contactee identifiers include contactee addresses.

3. The apparatus of claim 1, wherein the apparatus is configured such that the plurality of contactor identifiers include contactor aliases and the plurality of contactee identifiers include contactee aliases.

4. The apparatus of claim 1, wherein the apparatus is configured such that, in the event that a previous message is received prior to the first message where the previous message includes the first contactor identifier, the first contactor identifier is automatically selected for the first message.

5. The apparatus of claim 1, wherein the apparatus is configured such that the at least one contactee user interface element includes a textbox and a drop-down list.

6. The apparatus of claim 1, wherein the apparatus is configured such that the at least one contactee user interface element includes a textbox for receiving text and a list for listing, below the textbox, at least one of the first or second subset of the plurality of contactee identifiers of the plurality of contactee communicants.

7. The apparatus of claim 1, wherein the apparatus is configured such that the first subset of the plurality of contactee identifiers of the plurality of contactee communicants is displayed, based on a frequency of use of one or more of the first subset of the plurality of contactee identifiers of the plurality of contactee communicants.

8. The apparatus of claim 1, wherein the apparatus is configured such that only a portion of the first subset of the plurality of contactee identifiers of the plurality of contactee communicants is displayed with time-based information in connection with previous communications involving the first contactor identifier of the contactor communicant and the first subset of the plurality of contactee identifiers of the plurality of contactee communicants.

9. The apparatus of claim 1, wherein the apparatus is configured such that the first subset of the plurality of contactee identifiers of the plurality of contactee communicants is displayed based on a frequency of use thereof, and the second subset of the plurality of contactee identifiers of the plurality of contactee communicants is displayed based on a frequency of use thereof.

10. The apparatus of claim 1, wherein the apparatus is configured such that the first subset of the plurality of contactee identifiers of the plurality of contactee communicants is caused to be automatically identified, based on the selected first contactor identifier, such that the first subset of the plurality of contactee identifiers of the plurality of contactee communicants is automatically identified, based on previous communications involving the first contactor identifier of the contactor communicant and the first subset of the plurality of contactee identifiers of the plurality of contactee communicants.

11. The apparatus of claim 1, wherein the apparatus is configured such that the first subset of the plurality of contactee identifiers of the plurality of contactee communicants is caused to be automatically identified, based on the selected first contactor identifier in addition to user input received from the contactor communicant.

12. The apparatus of claim 1, wherein the apparatus is configured such that the at least one contactor user interface element includes a drop-down list.

13. The apparatus of claim 1, wherein the apparatus is configured such that the at least one contactor user interface element is configured to have presented, in connection therewith, the plurality of contactor identifiers of the contactor communicant, by listing the contactor identifiers.

14. The apparatus of claim 1, wherein the apparatus is configured such that the at least one contactor user interface element includes a spinner.

15. The apparatus of claim 1, wherein the apparatus is configured such that the at least one contactor user interface element is configured to have presented, in connection therewith, the plurality of contactor identifiers of the contactor communicant, by displaying the contactor identifiers as part of a spinner user interface element.

16. The apparatus of claim 1, wherein the apparatus is configured such that the at least one contactee user interface element is configured to have presented, in connection therewith, the plurality of contactee identifiers of the plurality of contactee communicants, by listing the plurality of contactee identifiers of the plurality of contactee communicants at least partially below a text box of the at least one contactee user interface element.

17. The apparatus of claim 1, wherein the apparatus is configured such that the contactor communicant is capable of selecting the first contactor identifier or the second contactor identifier without leaving the contactor window and while the contactor window includes the at least portion of the at least one contactor user interface element and the at least portion of the at least one contactee user interface element.

18. The apparatus of claim 1, wherein the apparatus is configured such that:
the plurality of contactor identifiers is displayed in a first list adjacent to a from-field of the at least one contactor user interface element before the receipt of the indication of the selection of the first contactor identifier or the second contactor identifier, and the selected first contactor identifier or the selected second contactor identifier is displayed in the from-field of the at least one contactor user interface element after the receipt of the indication of the selection of the first contactor identifier or the second contactor identifier; and
the first or second subset of the plurality of contactee identifiers is displayed in a second list adjacent to a to-field of the at least one contactee user interface element before the receipt of the indication of the selection of the at least one of the first or second subset of the plurality of contactee identifiers, and the selected at least one of the first or second subset of the plurality of contactee identifiers is displayed in the to-field of the at least one contactee user interface element after the receipt of the indication of the selection of the at least one of the first or second subset of the plurality of contactee identifiers; such that:
the first contactor identifier or the second contactor identifier is capable of being selected directly from the contactor window in connection with the at least one contactor user interface element while the contactor window simultaneously displays the at least portion of the at least one contactee user interface element, so that the first or second subset of the plurality of contactee identifiers are capable of being displayed, based on the receipt of the indication of the selection of the first contactor identifier or the second contactor identifier and in response to a user interaction with the at least one contactee user interface element, where the user interaction is capable of immediately following the receipt of the indication of the selection of the first contactor identifier or the second contactor identifier, without any other user interaction therebetween with any user interface element other than the at least one contactee user interface element.

19. The apparatus of claim 1, wherein the apparatus is configured such that each instance of the displaying and the receiving is capable of being accomplished without leaving the single email composition window.

20. The apparatus of claim 1, wherein the apparatus is configured such that the at least one contactee user interface element is configured to have presented, in connection therewith, the plurality of contactee identifiers of the plurality of contactee communicants, by listing the plurality of contactee identifiers of the plurality of contactee communicants at least partially below a text box of the at least one contactee user interface element;

the contactor communicant is capable of selecting the first contactor identifier or the second contactor identifier without leaving the contactor window; and the first or second subset of the plurality of contactee identifiers are capable of being displayed based on the receipt of the indication of the selection of the first contactor identifier or the second contactor identifier and in response to a user interaction with the at least one contactee user interface element, where the user interaction is capable of following the receipt of the indication of the selection of the first contactor identifier or the second contactor identifier, without any other user interaction with any user interface element other than the at least one contactee user interface element.

21. The apparatus of claim 1, wherein the apparatus is configured such that at least one of:

the apparatus includes a mobile device;

the input device and the screen are components of a touchscreen;

the input device and the screen are separate components;

the first message is displayed in response to entry thereof by the contactor communicant;

the first subset is automatically identified on the apparatus, based on the selected first contactor identifier;

the first subset is automatically identified on at least one server in communication with the apparatus, based on the selected first contactor identifier;

the one or more processors execute the instructions to cause the apparatus to communicate with at least one server in order to carry out at least one instance of the displaying and at least one instance of the receiving;

the instructions are included in a client-based application;

the instructions are included to access a network application installed on at least one server;

the one or more processors include at least one of: one or more instruction processing units (IPUs), one or more microprocessors, one or more digital signal processors (DSPs), one or more graphics processing units, one or more application-specific integrated circuits (ASICs), or one or more field programmable gate arrays (FPGAs);

the phrase one or more processors and the term instructions do not invoke 35 U.S.C. 112, paragraph six;

the single email composition window is singular despite including additional user interface elements including at least one of: one or more textboxes, one or more list boxes, one or more drop-down lists, one or more spinners, or one or more menus;

the single email composition window is singular despite including additional user interface elements including at least one of: one or more textboxes, one or more list boxes, one or more drop-down lists, one or more spinners, or one or more menus, where the additional user interface elements overlay at least a portion of the single email composition window;

the selection of the first contactor identifier or the second contactor identifier is initiated by causing a display of a drop down menu of the single email composition window, where the drop down menu includes the first contactor identifier and the second contactor identifier;

the selection of the first contactor identifier or the second contactor identifier is initiated by causing a display of a drop down menu of the single email composition window, and the selection is completed by receiving a selection of the first contactor identifier or the second contactor identifier via the at least one contactor user interface element;

the contactor communicant is permitted to initiate the selection of the first contactor identifier or the second contactor identifier directly from the single email composition window, by selecting the first contactor identifier or the second contactor identifier via the at least one contactor user interface element;

the single email composition window is configured to permit the contactor communicant to initiate the selection of the first contactor identifier or the second contactor identifier while the single email composition window includes only the portion of the at least one contactor user interface element and only the portion of the at least one contactee user interface element;

the single email composition window is configured to permit the contactor communicant to initiate the selection of the first contactor identifier or the second contactor identifier while the single email composition window includes an entirety of the at least one contactor user interface element and an entirety of the at least one contactee user interface element;

the switching between the selection of the first contactor identifier and the second contactor identifier via the single email composition window, includes selecting the first contactor identifier, and subsequently selecting the second contactor identifier;

the switching between the selection of the first contactor identifier and the second contactor identifier via the single email composition window, includes selecting the second contactor identifier, and subsequently selecting the first contactor identifier;

the review, via the single email composition window, of the difference between the first subset and the second subset of the plurality of contactee identifiers of the plurality of contactee communicants is permitted, by permitting the contactor communicant to select the first contactor identifier and then enter text of at least a portion of the first subset so as to prompt display of the first subset, and select the second contactor identifier and then enter text of at least a portion of the second subset so as to prompt display of the second subset;

the review, via the single email composition window, of the difference between the first subset and the second subset of the plurality of contactee identifiers of the plurality of contactee communicants is permitted, by permitting the contactor communicant to select the first contactor identifier so as to prompt, in response, display of the first subset, and select the second contactor identifier and, in response, display of the second subset;

the review, via the single email composition window, of the difference between the first subset and the second subset of the plurality of contactee identifiers of the plurality of contactee communicants is permitted, by permitting the contactor communicant to select the first contactor identifier so as to prompt, in response, automatic display of the first subset, and select the second contactor identifier and, in response, automatic display of the second subset;

the review, via the single email composition window, of the difference between the first subset and the second subset of the plurality of contactee identifiers of the plurality of contactee communicants is permitted, by permitting the contactor communicant to first select the first contactor identifier so as to review the first subset of the plurality of contactee identifiers of the plurality of contactee communicants, and subsequently select the second contactor identifier so as to review the second subset of the plurality of contactee identifiers of the plurality of contactee communicants;

the review, via the single email composition window, of the difference between the first subset and the second subset of the plurality of contactee identifiers of the plurality of contactee communicants is permitted, by permitting the contactor communicant to first select the first contactor identifier so as to review the first subset of the plurality of contactee identifiers of the plurality of contactee communicants, and subsequently select the second contactor identifier so as to review the second subset of the plurality of contactee identifiers of the plurality of contactee communicants;

the review, via the single email composition window, of the difference between the first subset and the second subset of the plurality of contactee identifiers of the plurality of contactee communicants is permitted, by simultaneously displaying the first subset and the second subset of the plurality of contactee identifiers of the plurality of contactee communicants;

the review, via the single email composition window, of the difference between the first subset and the second subset of the plurality of contactee identifiers of the plurality of contactee communicants is permitted, by displaying one or more contactee communicants that are not included in both the first subset and the second subset of the plurality of contactee identifiers of the plurality of contactee communicants;

the review, via the single email composition window, of the difference between the first subset and the second subset of the plurality of contactee identifiers of the plurality of contactee communicants is permitted, by displaying one or more contactee communicants that are included in only one of the first subset or the second subset of the plurality of contactee identifiers of the plurality of contactee communicants;

the review, via the single email composition window, of the difference between the first subset and the second subset of the plurality of contactee identifiers of the plurality of contactee communicants is permitted, by permitting the contactor communicant to first select the first contactor identifier so as to review the first subset of the plurality of contactee identifiers of the plurality of contactee communicants without review of the second subset of the plurality of contactee identifiers of the plurality of contactee communicants, and subsequently select the second contactor identifier so as to review the second subset of the plurality of contactee identifiers of the plurality of contactee communicants without review of the first subset of the plurality of contactee identifiers of the plurality of contactee communicants;

the contactor window is displayed by receiving a hypertext markup language (HTML)-equipped interface;

one or more instances of the receiving is carried out by receiving via a hypertext markup language (HTML)-equipped interface that is received over a network;

the contactor window is displayed using a browser;

the contactor window is displayed at a node of the contactor communicant;

the contactor window is displayed by the contactor email communications agent;

the contactor window includes an email interface window for generating the message and causing the message to be sent;

the at least one contactor user interface element includes at least of a contactor presentation user interface element or a contactor selection list user interface element;

the at least one contactor user interface element includes a contactor presentation user interface element and a contactor selection list user interface element;

the at least one contactor user interface element includes a selection user interface control element;

the at least one contactor user interface element includes a selection user interface element;

the at least one contactor user interface element includes a user interface control element;

the at least one contactee user interface element includes at least of a contactee presentation user interface element or a contactee selection list user interface element;

the at least one contactee user interface element includes a contactee presentation user interface element and a contactee selection list user interface element;

the plurality of contactor identifiers are presented in connection with the at least one contactor user interface element by being displayed at least partially thereunder;

the plurality of contactor identifiers are presented in connection with the at least one contactor user interface element by being displayed in a first contactor user interface element below a second contactor user interface element;

the plurality of contactor identifiers are presented in connection with the at least one contactor user interface element by being displayed in a first contactor user interface element component of a single contactor user interface element below a second contactor user interface element component of the single contactor user interface element;

the selected first contactor identifier is displayed in connection with the at least one contactor user interface element of the contactor window, by being displayed in the at least one contactor user interface element of the contactor window;

the plurality of contactee identifiers are presented in connection with the at least one contactee user interface element by being displayed at least partially thereunder;

the plurality of contactee identifiers are presented in connection with the at least one contactee user interface element by being displayed in a first contactee user interface element below a second contactee user interface element;

the plurality of contactee identifiers are presented in connection with the at least one contactee user interface element by being displayed in a first contactee user interface element component of a single contactee user interface element below a second contactee user interface element component of the single contactee user interface element;

the selected first contactor identifier of the plurality of contactor identifiers is displayed in connection with the at least one contactor user interface element of the contactor window, as being included in the first message;

the first subset of the plurality of contactee identifiers of the plurality of contactee communicants is displayed in connection with the at least one contactee user interface element of the contactor window, as being included in the first message;

display, in connection with the at least one contactee user interface element of the contactor window and utilizing the screen, the first subset of the plurality of contactee identifiers of the plurality of contactee communicants;

the first subset of the plurality of contactee identifiers is identified by being located;

the second subset of the plurality of contactee identifiers is identified by being located;

each instance of the indication of the selection is received as a result of a user touch on a corresponding user interface element;

each instance of the indication of the selection is received as a result of a user mouse input on a corresponding user interface element;

each instance of the indication includes a signal;

the first subset of the plurality of contactee identifiers is displayed after the identification thereof, by being displayed after an intermediate operation performed after the identification thereof;

the first subset of the plurality of contactee identifiers is displayed after the identification thereof, by being displayed after an intermediate user input is received after the identification thereof;

the first subset of the plurality of contactee identifiers is displayed in response to the identification thereof;

the first subset of the plurality of contactee identifiers is displayed directly after the identification thereof;

the second subset of the plurality of contactee identifiers is displayed after the identification thereof, by being displayed after an intermediate operation performed after the identification thereof;

the second subset of the plurality of contactee identifiers is displayed after the identification thereof, by being displayed after an intermediate user input is received after the identification thereof;

the second subset of the plurality of contactee identifiers is displayed in response to the identification thereof;

the second subset of the plurality of contactee identifiers is displayed directly after the identification thereof;

the first contactee identifier is not included in a communication associated with the first message prior to the selection thereof, and the first contactee identifier is included in the communication associated with the first message after the selection thereof;

the plurality of contactor identifiers is displayed in a list adjacent to a from-field before the receipt the indication of the selection of the first contactor identifier, and the first contactor identifier is displayed in the from-field after the receipt the indication of the selection of the first contactor identifier;

the first subset of the plurality of contactee identifiers is displayed in a list adjacent to a to-field before the receipt of the indication of the selection of the at least one of the first subset of the plurality of contactee identifiers, and the selected at least one of the first subset of the plurality of contactee identifiers is displayed in the to-field after the receipt of the indication of the selection of the at least one of the first subset of the plurality of contactee identifiers;

the plurality of contactor identifiers is displayed in a list adjacent to a from-field before the receipt the indication of the selection of the second contactor identifier, and the second contactor identifier is displayed in the from-field after the receipt the indication of the selection of the second contactor identifier;

the second subset of the plurality of contactee identifiers is displayed in a list adjacent to a to-field before the receipt of the indication of the selection of the at least one of the second subset of the plurality of contactee identifiers, and the selected at least one of the second subset of the plurality of contactee identifiers is displayed in the to-field after the receipt of the indication of the selection of the at least one of the second subset of the plurality of contactee identifiers;

the second subset of the plurality of contactee identifiers of the plurality of contactee communicants is different, at least in part, from the first subset of the plurality of contactee identifiers of the plurality of contactee communicants, such that selection of different contactor identifiers results in display of at least partially different contactee identifiers, by omitting at least one contactee identifier of the first subset of the plurality of contactee identifiers of the plurality of contactee communicants;

the second subset of the plurality of contactee identifiers of the plurality of contactee communicants is different, at least in part, from the first subset of the plurality of contactee identifiers of the plurality of contactee communicants, such that selection of different contactor identifiers results in display of at least partially different contactee identifiers, by including at least one contactee identifier that is not included in the first subset of the plurality of contactee identifiers of the plurality of contactee communicants;

the at least one first contactee email communications address corresponds to the selected at least one of the first subset of the plurality of contactee identifiers of the plurality of contactee communicants, by including the selected at least one of the first subset of the plurality of contactee identifiers of the plurality of contactee communicants;

the at least one first contactee email communications address corresponds to the selected at least one of the first subset of the plurality of contactee identifiers of the plurality of contactee communicants, by being associated with an alias of the selected at least one of the first subset of the plurality of contactee identifiers of the plurality of contactee communicants;

the at least one second contactee email communications address corresponds to the selected at least one of the second subset of the plurality of contactee identifiers of the plurality of contactee communicants, by including the selected at least one of the second subset of the plurality of contactee identifiers of the plurality of contactee communicants;

the at least one second contactee email communications address corresponds to the selected at least one of the second subset of the plurality of contactee identifiers of the plurality of contactee communicants, by being associated with an alias of the selected at least one of the second subset of the plurality of contactee identifiers of the plurality of contactee communicants; or the apparatus is part of a system that further comprises at least one server.

22. An apparatus, comprising:
a screen;
an input device;
at least one non-transitory memory storing instructions; and
one or more processors in communication with the screen, the input device, and the at least one non-transitory memory, wherein the one or more processors execute the instructions to cause the apparatus to:
display, utilizing the screen, a contactor email composition window including:
at least one contactor user interface element and a list of a plurality of contactor identifiers of a contactor communicant,
at least one contactee user interface element and at least one of a plurality of contactee identifiers of a plurality of contactee communicants,
a message user interface element and a message, and
a send user interface element;
receive, via the at least one contactor user interface element of the contactor email composition window and utilizing the input device, an indication of a selection of a first contactor identifier from the list of the plurality of contactor identifiers identifying the contactor communicant;
in response to the receipt, via the at least one contactor user interface element of the contactor email composition window and utilizing the input device, of the indication of the selection of the first contactor identifier from the list of the plurality of contactor identifiers identifying the contactor communicant: display, via the at least one contactor user interface element of the contactor email composition window and utilizing the screen, the selected first contactor identifier of the plurality of contactor identifiers identifying the contactor communicant;
based on the receipt, via the at least one contactor user interface element of the contactor email composition window and utilizing the input device, of the indication of the selection of the first contactor identifier from the list of the plurality of contactor identifiers identifying the contactor communicant: cause a first subset of the plurality of contactee identifiers of the plurality of contactee communicants to be automatically identified, based on the selected first contactor identifier;
after the identification, based on the selected first contactor identifier, of the first subset of the plurality of contactee identifiers of the plurality of contactee communicants: display, via the at least one contactee user interface element of the contactor email composition window and utilizing the screen, the first subset of the plurality of contactee identifiers of the plurality of contactee communicants;
after the display, via the at least one contactee user interface element of the contactor email composition window and utilizing the screen, of the first subset of the plurality of contactee identifiers of the plurality of contactee communicants: receive, via the at least one contactee user interface element of the contactor email composition window and utilizing the input device, an indication of a selection of at least one of the first subset of the plurality of contactee identifiers of the plurality of contactee communicants;
in response to the receipt, via the at least one contactee user interface element of the contactor email composition window and utilizing the input device, of the indication of the selection of the at least one of the first subset of the plurality of contactee identifiers of the plurality of contactee communicants: display, via the at least one contactee user interface element of the contactor email composition window and utilizing the screen, the selected at least one of the first subset of the plurality of contactee identifiers of the plurality of contactee communicants;
display, via the message user interface element of the contactor email composition window and utilizing the screen, a first message;
receive, via the send user interface element of the contactor email composition window and utilizing the input device, an indication of a selection of the send user interface element for the first message;
in response to the receipt, via the send user interface element of the contactor email composition window and utilizing the input device, of the indication of the selection of the send user interface element for the first message: send the first message to at least one first contactee email communications address corresponding to the selected at least one of the first subset of the plurality of contactee identifiers of the plurality of contactee communicants;
receive, via the at least one contactor user interface element of the contactor email composition window and utilizing the input device, an indication of a selection of a second contactor identifier from the list of the plurality of contactor identifiers identifying the contactor communicant;
in response to the receipt, via the at least one contactor user interface element of the contactor email composition window and utilizing the input device, of the indication of the selection of the second contactor identifier from the list of the plurality of contactor identifiers identifying the contactor communicant: display, via the at least one contactor user interface element of the contactor email composition window and utilizing the screen, the selected second contactor identifier of the plurality of contactor identifiers identifying the contactor communicant;
based on the receipt, via the at least one contactor user interface element of the contactor email composition window and utilizing the input device, of the indication of the selection of the second contactor identifier from the list of the plurality of contactor identifiers identifying the contactor communicant: cause a second subset of the plurality of contactee identifiers of the plurality of contactee communicants to be automatically identified, based on the selected second contactor identifier;
after the identification, based on the selected second contactor identifier, of the second subset of the plurality of contactee identifiers of the plurality of contactee communicants: display, via the at least one contactee user interface element of the contactor email composition window and utilizing the screen, the second subset of the plurality of contactee identifiers of the plurality of contactee communicants, such that selection of different contactor identifiers results in display of at least partially different contactee identifiers;
after the display, via the at least one contactee user interface element of the contactor email composition window and utilizing the screen, of the second subset of the plurality of contactee identifiers of the plurality of contactee communicants: receive, via the at least one contactee user interface element of the contactor email composition window and utilizing the input device, an indication of a selection of at least one of the second subset of the plurality of contactee identifiers of the plurality of contactee communicants;

in response to the receipt, via the at least one contactee user interface element of the contactor email composition window and utilizing the input device, of the indication of the selection of the at least one of the second subset of the plurality of contactee identifiers of the plurality of contactee communicants: display, via the at least one contactee user interface element of the contactor email composition window and utilizing the screen, the selected at least one of the second subset of the plurality of contactee identifiers of the plurality of contactee communicants;

display, via the message user interface element of the contactor email composition window and utilizing the screen, a second message;

receive, via the send user interface element of the contactor email composition window and utilizing the input device, an indication of a selection of the send user interface element for the second message; and in response to the receipt, via the send user interface element of the contactor email composition window and utilizing the input device, of the indication of the selection of the send user interface element for the second message: send the second message to at least one second contactee email communications address corresponding to the selected at least one of the second subset of the plurality of contactee identifiers of the plurality of contactee communicants;

wherein the apparatus is configured such that the contactor window includes a single email composition window configured to permit the contactor communicant to initiate a selection of the first contactor identifier or the second contactor identifier directly from the single email composition window and while the single email composition window includes at least a portion of the at least one contactor user interface element and at least a portion of the at least one contactee user interface element, so as to permit switching between the selection of the first contactor identifier and the second contactor identifier via the single email composition window, in order to permit a review, via the single email composition window, of a difference between the first subset and the second subset of the plurality of contactee identifiers of the plurality of contactee communicants.

23. The apparatus of claim 22, wherein the apparatus is configured such that:

the plurality of contactor identifiers include at least one of contactor addresses or contactor aliases;

the plurality of contactee identifiers include at least one of contactee addresses or contactee aliases;

the at least one contactee user interface element includes a textbox for receiving text;

the at least one contactor user interface element includes at least one of a drop-down list or a spinner; and the first subset of the plurality of contactee identifiers of the plurality of contactee communicants is caused to be automatically identified, based on the selected first contactor identifier, such that the first subset of the plurality of contactee identifiers of the plurality of contactee communicants is automatically identified, based on previous communications involving the first contactor identifier of the contactor communicant and the first subset of the plurality of contactee identifiers of the plurality of contactee communicants.

24. The apparatus of claim 23, wherein the apparatus is configured such that the first subset of the plurality of contactee identifiers of the plurality of contactee communicants is displayed, based on a frequency of use of one or more of the first subset of the plurality of contactee identifiers of the plurality of contactee communicants.

25. The apparatus of claim 23, wherein the apparatus is configured such that:

the list includes a first list and the plurality of contactor identifiers is displayed in the first list adjacent to a from-field of the at least one contactor user interface element before the receipt of the indication of the selection of the first contactor identifier or the second contactor identifier, and the first contactor identifier or the second contactor identifier is displayed in the from-field of the at least one contactor user interface element after the receipt of the indication of the selection of the first contactor identifier or the second contactor identifier; and the first or second subset of the plurality of contactee identifiers is displayed in a second list adjacent to a to-field of the at least one contactee user interface element before the receipt of the indication of the selection of the at least one of the first or second subset of the plurality of contactee identifiers, and the selected at least one of the first or second subset of the plurality of contactee identifiers is displayed in the to-field of the at least one contactee user interface element after the receipt of the indication of the selection of the at least one of the first or second subset of the plurality of contactee identifiers.

26. A computer-implemented method, comprising:

providing access to at least one server utilizing an apparatus including: a screen, an input device, at least one non-transitory memory storing instructions, and one or more processors in communication with the screen, the input device, and the at least one non-transitory memory; and communicating with the at least one server such that the apparatus is configured to:

display, utilizing the screen, a contactor window that simultaneously includes:

at least one contactor user interface element configured to simultaneously present a plurality of contactor identifiers of a contactor communicant so that one of the plurality of contactor identifiers is capable of being selected, at least one contactee user interface element configured to suggest at least one of a plurality of contactee identifiers of a plurality of contactee communicants so that one or more of the plurality of contactee identifiers is capable of being selected, a message user interface element, and a send user interface element;

receive, utilizing the input device, an indication of a selection of a first contactor identifier from the simultaneously presented plurality of contactor identifiers;

in response to the receipt, utilizing the input device, of the indication of the selection of the first contactor identifier from the simultaneously presented plurality of contactor identifiers: display, utilizing the screen, the selected first contactor identifier of the plurality of contactor identifiers identifying the contactor communicant;

based on the receipt, utilizing the input device, of the indication of the selection of the first contactor identifier from the simultaneously presented plurality of contactor identifiers: cause a first subset of the plurality of contactee identifiers of the plurality of contactee communicants to be automatically identified, based on the selected first contactor identifier;

in response to the identification, based on the selected first contactor identifier, of the first subset of the plurality of contactee identifiers of the plurality of contactee communicants: display, utilizing the screen, the first subset of the plurality of contactee identifiers of the plurality of contactee communicants;

after the display, utilizing the screen, of the first subset of the plurality of contactee identifiers of the plurality of contactee communicants: receive, utilizing the input device, an indication of a selection of at least one of the first subset of the plurality of contactee identifiers of the plurality of contactee communicants;

in response to the receipt, utilizing the input device, of the indication of the selection of the at least one of the first subset of the plurality of contactee identifiers of the plurality of contactee communicants: display, utilizing the screen, the selected at least one of the first subset of the plurality of contactee identifiers of the plurality of contactee communicants;

display, utilizing the screen, a first message;

receive, utilizing the input device, an indication of a selection of the send user interface element for the first message;

in response to the receipt, utilizing the input device, of the indication of the selection of the send user interface element for the first message: send the first message to at least one first contactee email communications address corresponding to the selected at least one of the first subset of the plurality of contactee identifiers of the plurality of contactee communicants;

receive, utilizing the input device, an indication of a selection of a second contactor identifier from the simultaneously presented plurality of contactor identifiers;

in response to the receipt, utilizing the input device, of the indication of the selection of the second contactor identifier from the simultaneously presented plurality of contactor identifiers: display, utilizing the screen, the selected second contactor identifier of the plurality of contactor identifiers identifying the contactor communicant;

based on the receipt, utilizing the input device, of the indication of the selection of the second contactor identifier from the simultaneously presented plurality of contactor identifiers: cause a second subset of the plurality of contactee identifiers of the plurality of contactee communicants to be automatically identified, based on the selected second contactor identifier;

in response to the identification, based on the selected second contactor identifier, of the second subset of the plurality of contactee identifiers of the plurality of contactee communicants: display, utilizing the screen, the second subset of the plurality of contactee identifiers of the plurality of contactee communicants, such that selection of different contactor identifiers results in display of at least partially different contactee identifiers;

after the display, utilizing the screen, of the second subset of the plurality of contactee identifiers of the plurality of contactee communicants: receive, utilizing the input device, an indication of a selection of at least one of the second subset of the plurality of contactee identifiers of the plurality of contactee communicants;

in response to the receipt, utilizing the input device, of the indication of the selection of the at least one of the second subset of the plurality of contactee identifiers of the plurality of contactee communicants: display, utilizing the screen, the selected at least one of the second subset of the plurality of contactee identifiers of the plurality of contactee communicants;

display, utilizing the screen, a second message;

receive, utilizing the input device, an indication of a selection of the send user interface element for the second message; and in response to the receipt, utilizing the input device, of the indication of the selection of the send user interface element for the second message: send the second message to at least one second contactee email communications address corresponding to the selected at least one of the second subset of the plurality of contactee identifiers of the plurality of contactee communicants;

wherein the contactor window includes a single email composition window configured to permit the contactor communicant to initiate a selection of the first contactor identifier or the second contactor identifier directly from the single email composition window and while the single email composition window includes at least a portion of the at least one contactor user interface element and at least a portion of the at least one contactee user interface element, so as to permit switching between the selection of the first contactor identifier and the second contactor identifier via the single email composition window, in order to permit a review, via the single email composition window, of a difference between the first subset and the second subset of the plurality of contactee identifiers of the plurality of contactee communicants.

27. The computer-implemented method of claim 26, wherein:

the plurality of contactor identifiers include at least one of contactor addresses or contactor aliases;

the plurality of contactee identifiers include at least one of contactee addresses or contactee aliases;

the at least one contactee user interface element includes a textbox for receiving text and a list for listing there below at least one of the first subset or the second subset of the plurality of contactee identifiers of the plurality of contactee communicants;

the at least one contactor user interface element includes at least one of a drop-down list or a spinner;

the first subset of the plurality of contactee identifiers of the plurality of contactee communicants is caused to be automatically identified, based on the selected first contactor identifier, such that the first subset of the plurality of contactee identifiers of the plurality of contactee communicants is automatically identified, based on previous communications involving the first contactor identifier of the contactor communicant and the first subset of the plurality of contactee identifiers of the plurality of contactee communicants; and the second subset of the plurality of contactee identifiers of the plurality of contactee communicants is caused to be automatically identified, based on the selected second contactor identifier, such that the second subset of the plurality of contactee identifiers of the plurality of contactee communicants is automatically identified, based on previous communications involving the second contactor identifier of the contactor communicant and the second subset of the plurality of contactee identifiers of the plurality of contactee communicants.

* * * * *